United States Patent
Kang et al.

(10) Patent No.: US 9,762,905 B2
(45) Date of Patent: Sep. 12, 2017

(54) DISPARITY VECTOR REFINEMENT IN VIDEO CODING

(71) Applicant: QUALCOMM Incorporated, San Diego, CA (US)

(72) Inventors: Jewon Kang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 14/172,410

(22) Filed: Feb. 4, 2014

(65) Prior Publication Data

US 2014/0286421 A1    Sep. 25, 2014

Related U.S. Application Data

(60) Provisional application No. 61/804,583, filed on Mar. 22, 2013.

(51) Int. Cl.
*H04N 19/597* (2014.01)
*H04N 19/51* (2014.01)
*H04N 19/533* (2014.01)

(52) U.S. Cl.
CPC ....... *H04N 19/00769* (2013.01); *H04N 19/51* (2014.11); *H04N 19/533* (2014.11); *H04N 19/597* (2014.11)

(58) Field of Classification Search
CPC ........... H04N 19/597; H04N 19/00769; H04N 19/533; H04N 19/51
USPC ........................................ 375/240.16, 240.25
See application file for complete search history.

(56) References Cited

U.S. PATENT DOCUMENTS

| | | | |
|---|---|---|---|
| 2008/0285654 A1* | 11/2008 | Cai | H04N 19/597 375/240.16 |
| 2009/0116558 A1* | 5/2009 | Chen | H04N 19/597 375/240.16 |
| 2011/0044550 A1* | 2/2011 | Tian | H04N 19/597 382/238 |

(Continued)

FOREIGN PATENT DOCUMENTS

| | | |
|---|---|---|
| WO | 2010043773 A1 | 4/2010 |
| WO | 2012177166 A1 | 12/2012 |

(Continued)

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — Zhihan Zhou
(74) *Attorney, Agent, or Firm* — Shumaker & Sieffert, P.A.

(57) ABSTRACT

A video coding device performs a disparity vector derivation process for a current block of multi-view video data. The current block is in a current view. An availability value indicates that a disparity vector for the current block is unavailable when the disparity vector derivation process is unable to derive the disparity vector for the current block. When the availability value indicates that the disparity vector derivation process has not derived the disparity vector for the current block, the video coding device generates a disparity vector for the current block in another manner.

27 Claims, 11 Drawing Sheets

(56) References Cited

U.S. PATENT DOCUMENTS

| | | | |
|---|---|---|---|
| 2012/0140038 A1 | 6/2012 | Bi et al. | |
| 2014/0028793 A1* | 1/2014 | Wiegand | H04N 13/0011 348/42 |
| 2015/0201215 A1* | 7/2015 | Chen | H04N 19/597 348/42 |

FOREIGN PATENT DOCUMENTS

| | | |
|---|---|---|
| WO | 2013053309 A1 | 4/2013 |
| WO | 2013109252 A1 | 7/2013 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, CH, Nov. 21-30, 2011, JCTVC-G1103_d2, 214 pp.

Chang et al., "3D-CE1.h: Depth-oriented Neighboring Block Disparity Vector (DoNBDV) with virtual depth retrieval," JCT-3V Meeting, MPEG Meeting, Geneva, CH (The Joint Collaborative Team on 3D Video Coding Extension Development of ITU-T SG16 WP 3 and ISO/IEC JTC 1/SC 29/WG 11), URL: http://phenix.int-evry.fr/jct2/, No. JCT3V-C0131, Jan. 17-23, 2013, 5 pp.

International Search Report and Written Opinion—PCT/US2014/014835—ISA/EPO—May 14, 2014, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Lee et al., "3D-CE2.h Related Results on Disparity Vector Derivation," JCT-3V Meeting; MPEG Meeting; Geneva; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-C0097, Jan. 17-23, 2013, 4 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding," JCTVC-C403, 3rd Meeting: Guangzhou, CN, Oct. 7-15, 2010, 137 pp.

Second Written Opinion of International Application No. PCT/US2014/014835, mailed Feb. 27, 2015, 13 pp.

International Preliminary Report on Patentability from International Application No. PCT/US2014/014835, mailed May 26, 2015, 9 pp.

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

ITU-T H.264, Series H: Audiovisual and Multimedia Systems, Infrastructure of audiovisual services—Coding of moving video, Advanced video coding for generic audiovisual services, The International Telecommunication Union, Mar. 2010, 674 pp.

Zhang et al., "CE5.h: Disparity vector generation results," Joint Collaborative Team on 3D Video Coding Extension Development of ITU-T SG 16 WP 3 and ISO/IEC JTC 1/SC 29/WG 11, Document: JCT2-A0097, Jul. 16-20, 2012, 5 pp.

Sung et al., "3D-CE5.h: Simplification of disparity vector derivation for HEVC-based 3D video coding," Joint Collaborative Team on 3D Video Coding Extension Development of ITU-T SG 16 WP 3 and ISO/IEC JTC 1/SC 29/WG 11, Document: JCT2-A0126, Jul. 16-20, 2012, 4 pp.

Kang et al., "3D-CE5.h related: Improvements for disparity vector derivation," Joint Collaborative Team on 3D Video Coding Extension Development of ITU-T SG 16 WP 3 and ISO/IEC JTC 1/SC 29/WG 11, Document: JCT3V-B0047, Oct. 13-19, 2012, 4 pp.

Tech et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V-B1005_d0, Oct. 13-19, 2012, 118 pp.

Tian et al., "CE1.h: Backward View Synthesis Prediction using Neighbouring Blocks," Joint Collaborative Team on 3D Video Coding Extension Development of ITU-T SG 16 WP 3 and ISO/IEC JTC 1/SC 29/WG 11, Document: JCT3V-C0152, Jan. 17-23, 2013, 5 pp.

Tech et al., "3D-HEVC Test Model 3," Joint Collaborative Team on 3D Video Coding Extension Development of ITU-T SG 16 WP 3 and ISO/IEC JTC 1/SC 29/WG 11, Document: JCT3V-C1005_d0, Jan. 17-23, 2013, 51 pp.

Tech et al., "3D-HEVC Test Model 3," Joint Collaborative Team on 3D Video Coding Extension Development of ITU-T SG 16 WP 3 and ISO/IEC JTC 1/SC 29/WG 11, Document: JCT3V-C1005_spec_d1, Jan. 17-23, 2013, 91 pp.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, Meeting date: Oct. 10-19, 2012, Document: JCTVC-K1003_v10, Nov. 28, 2012, 306 pp.

* cited by examiner

DISPARITY VECTOR REFINEMENT IN VIDEO CODING

This application claims the benefit of U.S. Provisional Patent Application No. 61/804,583, filed Mar. 22, 2013, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards have been developed that make use of multi-view coding aspects. For example, different views may transmit left and right eye views to support 3D video. Alternatively, some 3D video coding processes may apply so-called multi-view plus depth coding. In multi-view plus depth coding, a 3D video bitstream may contain not only texture view components, but also depth view components. For example, each view may comprise one texture view component and one depth view component.

SUMMARY

In general, this disclosure relates to multi-view video coding. More specifically, a video coder may perform a disparity vector derivation process for a current block of multi-view video data. When the disparity vector derivation process does not produce an available disparity vector, the video coder may perform a disparity vector refinement process to generate a refined disparity vector for the current block. The techniques of this disclosure may be applicable to disparity vector derivation when backward view synthesis prediction is supported.

In one example, this disclosure describes a method for decoding multi-view video data, the method comprising: performing a disparity vector derivation process for a current block of the multi-view video data, the current block being in a current view; setting an availability value such that the availability value indicates that a disparity vector for the current block is unavailable when the disparity vector derivation process is unable to derive the disparity vector for the current block; when the availability value indicates that the disparity vector for the current block is unavailable, generating a refined disparity vector for the current block by performing a disparity vector refinement process that accesses a depth view component of a reference view; and decoding the current block based on the refined disparity vector for the current block.

In another example, this disclosure describes a method for encoding multi-view video data, the method comprising: performing a disparity vector derivation process for a current block of the multi-view video data, the current block being in a current view; setting an availability value such that the availability value indicates that a disparity vector for the current block is unavailable when the disparity vector derivation process is unable to derive the disparity vector for the current block; when the availability value indicates that the disparity vector for the current block is unavailable, generating a refined disparity vector for the current block by performing a disparity vector refinement process that accesses a depth view component of a reference view; and encoding the current block based on the refined disparity vector for the current block.

In another example, this disclosure describes a video coding device comprising a memory that stores multi-view video data and one or more processors configured to: perform a disparity vector derivation process for a current block of the multi-view video data, the current block being in a current view; set an availability value such that the availability value indicates that a disparity vector for the current block is unavailable when the disparity vector derivation process is unable to derive the disparity vector for the current block; and when the availability value indicates that the disparity vector for the current block is unavailable, perform a disparity vector refinement process to generate a refined disparity vector for the current block.

In another example, this disclosure describes a video coding device comprising: means for performing a disparity vector derivation process for a current block of multi-view video data, the current block being in a current view; means for setting an availability value such that the availability value indicates that a disparity vector for the current block is unavailable when the disparity vector derivation process is unable to derive the disparity vector for the current block; and means for generating, when the availability value indicates that the disparity vector for the current block is unavailable, a refined disparity vector for the current block by performing a disparity vector refinement process that accesses a depth view component of a reference view.

In another example, this disclosure describes a non-transitory computer-readable data storage medium having instructions stored thereon that, when executed, configure one or more processors to: perform a disparity vector derivation process for a current block of multi-view video data, the current block being in a current view; set an availability value such that the availability value indicates that a disparity vector for the current block is unavailable when the disparity vector derivation process is unable to derive the disparity vector for the current block; and when the availability value indicates that the disparity vector derivation process has not derived the disparity vector for the current block, generate a refined disparity vector for the current block by performing a disparity vector refinement process that accesses a depth view component of a reference view.

In another example, this disclosure describes a method for decoding multi-view video data, the method comprising: performing a disparity vector derivation process for a current block of the multi-view video data, the current block being in a current view; when the disparity vector derivation process determines that a disparity vector for the current block is unavailable, determining the disparity vector for the current block by adding an offset to a zero disparity vector; and decoding the current block based on the disparity vector for the current block.

In another example, this disclosure describes a method for encoding multi-view video data, the method comprising: performing a disparity vector derivation process for a current block of the multi-view video data, the current block being in a current view; when the disparity vector derivation process determines that a disparity vector for the current block is unavailable, determining the disparity vector for the current block by adding an offset to a zero disparity vector; and encoding the current block based on the disparity vector for the current block.

In another example, this disclosure describes a device for coding multi-view video data, the device comprising a memory that stores multi-view video data and one or more processors configured to: perform a disparity vector derivation process for a current block of the multi-view video data, the current block being in a current view; when the disparity vector derivation process determines that a disparity vector for the current block is unavailable, determine the disparity vector for the current block by adding an offset to a zero disparity vector; and code the current block based on the disparity vector for the current block.

In another example, this disclosure describes a device for coding multi-view video data, the device comprising: means for performing a disparity vector derivation process for a current block of the multi-view video data, the current block being in a current view; means for determining, when the disparity vector derivation process determines that a disparity vector for the current block is unavailable, the disparity vector for the current block by adding an offset to a zero disparity vector; and means for coding the current block based on the disparity vector for the current block.

In another example, this disclosure describes a non-transitory computer-readable data storage medium having instructions stored thereon that, when executed by one or more processors of a device for coding multi-view video data, cause the device to: perform a disparity vector derivation process for a current block of the multi-view video data, the current block being in a current view; when the disparity vector derivation process determines that a disparity vector for the current block is unavailable, determine the disparity vector for the current block by adding an offset to a zero disparity vector; and code the current block based on the disparity vector for the current block.

The details of one or more examples of the disclosure are set forth in the accompanying drawings and the description below. Other features, objects, and advantages will be apparent from the description, drawings, and claims.

DETAILED DESCRIPTION

Figure 1:
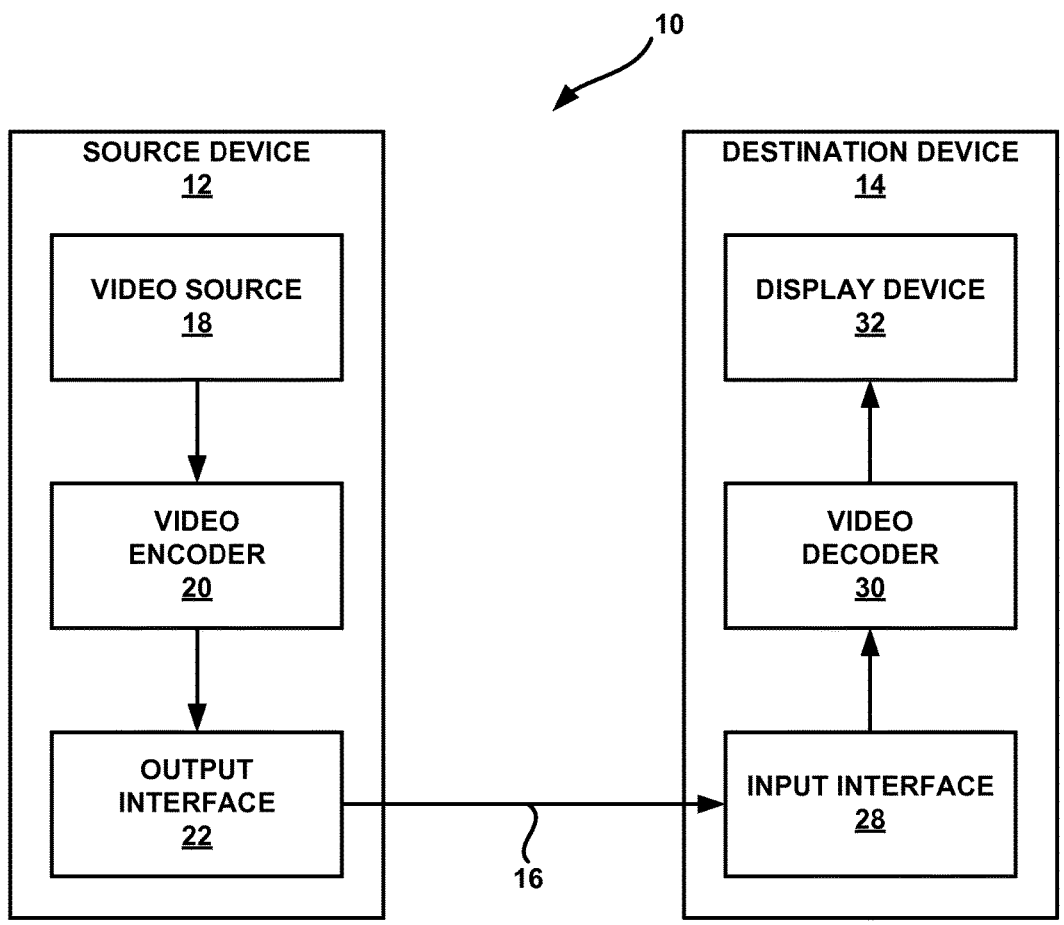
FIG. 1 is a block diagram illustrating an example video coding system that may utilize the techniques described in this disclosure.

High-Efficiency Video Coding (HEVC) is a newly-developed video coding standard. 3D-HEVC is an extension of HEVC for 3-dimensional video data. 3D-HEVC provides for multiple views of the same scene from different viewpoints. The standardization efforts for 3D-HEVC include the standardization of a multi-view video codec based on HEVC. In 3D-HEVC, inter-view prediction based on the reconstructed view components from different views is enabled. To improve coding efficiency further, two new coding tools, namely inter-view motion prediction and inter-view residual prediction, have been adopted in some versions of the reference software for 3D-HEVC.

In 3D-HEVC, inter-view motion prediction is similar to the motion compensation used in standard HEVC and may utilize the same or similar syntax elements. Merge mode, skip mode, and Advanced Motion Vector Prediction (AMVP) mode are example types of motion prediction. When a video coder performs inter-view motion prediction on a prediction unit (PU), the video coder may use, as a source of motion information, a picture that is in the same access unit as the PU, but in a different view. In contrast, conventional motion compensation only uses pictures in different access units as reference pictures. Thus, in 3D-HEVC, the motion parameters of a block in a dependent view may be predicted or inferred based on already-coded motion parameters in other views of the same access unit.

When a video coder performs motion prediction, the video coder may generate a candidate list (e.g., a merging candidate list or an AMVP candidate list) when the motion information of a current PU is signaled using merge mode, skip mode, or AMVP mode. To implement inter-view motion prediction in 3D-HEVC, the candidate list may include inter-view predicted motion vector candidates. The video coder may use an inter-view predicted motion vector candidate in the same manner as other candidates in a candidate list. An inter-view predicted motion vector candidate may specify the motion information of a PU (i.e., a reference PU) of a disparity reference picture. The disparity reference picture may be in the same access unit as a current PU, but in a different view than the current PU. To determine a reference PU in a disparity reference picture, the video coder may perform a disparity vector construction process to determine a disparity vector for the current PU. The disparity vector for the current PU may indicate a spatial displacement between a prediction block of the current PU and a location within the disparity reference picture. The reference PU may be a PU of the disparity reference picture that covers the location indicated by the disparity vector.

In general, view synthesis prediction (VSP) is a technique that warps a picture from a neighboring viewpoint to the current viewpoint for prediction purposes. Depth information is used to perform the warping. Backward-warping VSP (BVSP) uses the neighboring blocks to derive a depth block to perform the backward warping operation. In backward warping, the depth used for warping is from the same viewpoint of the current picture, which typically requires depth first coding in the dependent view. In order to estimate the depth information for a block in BVSP, a video coder may derive a disparity vector from the neighboring blocks. The video coder may then use the derived disparity vector to obtain a depth block from a reference view.

The video coder may perform a method called Neighboring Blocks based Disparity Vector (NBDV) to derive a disparity vector. When the video coder uses NBDV derivation to derive a disparity vector for a current PU, the video coder may use disparity motion vectors from spatial and temporal neighboring blocks to derive the disparity vector. In this disclosure, a disparity motion vector of a PU refers to a motion vector that indicates a position in a disparity reference picture (i.e., a reference picture that is in a different view than the PU). Furthermore, for ease of explanation, this disclosure may refer to either spatially-neighboring blocks or temporally-neighboring blocks as neighboring blocks.

A video coder can use a depth view component of a reference view to refine a disparity vector. The video coder may use the same refinement process to refine a disparity motion vector for use in backward view synthesis prediction. In particular, the video coder may use the NBDV process to determine a disparity vector for a current PU.

When the video coder determines an available disparity vector using NBDV derivation (e.g., when the video coder finds a disparity motion vector among neighboring blocks), the video coder may further refine the disparity vector by retrieving depth data from the reference view's depth map. The refinement process includes two steps. First, the video coder locates a corresponding depth block by the derived disparity vector in the previously coded reference depth view, such as the base view. The size of the corresponding depth block is the same as that of the current PU. Second, the video coder selects one depth value from four corner pixels of the corresponding depth block and converts the selected depth value to the horizontal component of the refined disparity vector. The vertical component of the disparity vector is unchanged.

The above process is also called NBDV refinement (NBDV-R) or depth oriented NBDV (Do-NBDV). The video coder may use the refined disparity vector for inter-view motion prediction while the video coder may use the unrefined disparity vector for inter-view residual prediction. Furthermore, the video coder may store the refined disparity vector as a motion vector of a PU if the PU is coded with backward VSP mode. When the NBDV process does not provide an available disparity vector, the above NBDV-R process is skipped and a zero disparity vector is directly returned.

The current disparity vector derivation method in 3D-HEVC has several problems. For example, when the NBDV process provides an unavailable disparity vector, the video coder may skip the NBDV-R process to refine the disparity vector. This may lead to a coding performance drop.

The techniques of this disclosure may solve the previously-mentioned problems or shortcomings. That is, this disclosure may provide a better refined disparity vector by accessing the depth view component of a reference view when a disparity vector derivation method (e.g., NBDV in 3D-HEVC) cannot produce an available disparity vector.

In some examples, a video decoder may perform a disparity vector derivation process for a current block of multi-view video data. When the disparity vector derivation process does not produce an available disparity vector, the video decoder may nevertheless still perform a disparity vector refinement process to generate a refined disparity vector for the current block. In some such examples, the disparity vector refinement process uses a zero disparity vector. In other words, the disparity vector refinement process is not limited to cases where the disparity vector derivation process produces an available disparity vector. Even if the disparity vector derivation process does not produce an available disparity vector, the techniques of this disclosure allow for disparity vector refinement with respect to some default disparity vector (such as a default disparity vector having horizontal and vertical components equal to zero).

In some examples, a variable is maintained to identify whether the disparity vector derivation process (e.g., NBDV derivation) originally returned an available disparity vector or not. This variable can be used for other coding tools in certain conditions. For instance, this flag equal to 0 may lead to the disabling of the inter-view residual prediction for the current block.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory. The data may include video data, such as multi-view video data.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based 3DV extension. In some instances, any bitstream conforming to the MVC-based 3DV extension of H.264/AVC always contains a sub-bitstream that is compliant to the MVC extension of H.264/AVC. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10$^{th}$ Meeting, Stockholm, Sweden, July 2012. Another draft of the HEVC standard, referred to as "HEVC Working Draft 9" is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11$^{th}$ Meeting, Shanghai, China, October 2012. Furthermore, there are ongoing efforts to produce scalable video coding, multi-view coding, and 3DV extensions for HEVC. The scalable video coding extension of HEVC may be referred to as SHEVC.

Currently, a Joint Collaboration Team on 3D Video Coding (JCT-3C) of VCEG and MPEG is developing a 3DV standard based on HEVC, for which part of the standardization efforts includes the standardization of the multi-view video codec based on HEVC (MV-HEVC) and another part includes the standardization of 3D video coding based on HEVC (3D-HEVC). For 3D-HEVC, new coding tools, including those at the coding unit/prediction unit level, for both texture and depth views may be included and supported. A software 3D-HTM for 3D-HEVC can be downloaded from the following link. [3D-HTM version 6.0]: https://hevc.hhi.fraunhofer.de/svn/svn_3DVCSoftware/tags/HTM-6.0/

The reference software description as well as the working draft of 3D-HEVC is available as follows: Gerhard Tech, Krzysztof Wegner, Ying Chen, Sehoon Yea, "3D-HEVC Test Model Description draft 2," JCT3V-B1005, Joint Collaborative Team on 3D Video Coding Extension Development of ITU-T SG 16 WP 3 and ISO/IEC JTC 1/SC 29/WG 11, 2nd Meeting: Shanghai, CN, October 2012, which as of Dec. 24, 2013, can be downloaded from the following link: http://phenix.it-sudparis.eu/jct2/doc_end_user/documents/2_Shanghai/wg11/JCT3V-B1005-v1.zip. Another version of the reference software description of 3D-HEVC may be available from http://phenix.it-sudparis.eu/jct2/doc_end_user/current_document.php?id=706. Another draft of 3D-HEVC, referred to as "3D-HEVC Test Model Description Draft 3," is described in Tech et al., "3D-HEVC Test Model 3," Joint Collaborative Team on 3D Video Coding Extension Development of ITU-T SG 16 WP 3 and ISO/IEC JTC 1/SC 29/WG 11 3rd Meeting: Geneva, CH, 17-23 Jan. 2013, document no. JCT3V-C1005_spec_d1. Video encoder 20 and video decoder 30 may operate according to SHEVC, MV-HEVC, and/or 3D-HEVC.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In general, the size of a block may refer to the size of a sample block associated with the block.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on samples of the picture associated with the PU. In this disclosure, the phrase "based on" may indicate "based at least in part on."

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional (i.e., uni-prediction) or bi-directional (i.e., bi-prediction). To perform inter prediction, video encoder 20 may generate a first reference picture list (RefPicList0) for a current picture and may also generate a second reference picture list (RefPicList1) for the current picture. Each of the reference picture lists may include one or more reference pictures. After a reference picture list is constructed (namely RefPicList0 and RefPicList1 if available), a reference index to a reference picture list can be used to identify any reference picture included in the reference picture list.

When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. The motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may generate, based at least in part on samples corresponding to the first and second reference locations, the predictive blocks for the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location.

After video encoder 20 generates one or more predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose residual blocks of a CU (e.g., luma, Cb, and Cr residual blocks of the CU) into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, supplemental enhancement information (SEI), and so on. NAL units that encapsulate RBSPs for video coding data (as opposed to RBSPs for parameter sets and SEI messages) may be referred to as video coding layer (VCL) NAL units.

In HEVC, SPSs may contain information that applies to all slices of a coded video sequence (CVS). In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A VPS is a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As indicated above, a CU may be partitioned into one or more PUs. The term "part_mode" may denote the partitioning mode of the current CU. In other words, part_mode may denote the manner in which a CU is partitioned into PUs. In HEVC, the value of part_mode may be restricted as follows:

If the coding mode of one CU is equal to MODE_INTRA, part_mode shall be equal to 0 or 1. The coding mode of a CU may indicate whether the CU is coded using intra prediction (i.e., MODE_INTRA) or inter prediction (i.e., MODE_INTER).

Otherwise (the coding mode of one CU is equal to MODE_INTER), the following may apply:
　If the size of the current CU is greater than the size of a smallest allowable CU and asymmetric motion partitioning is enabled, part_mode shall be in the range of 0 to 2, inclusive and in the range of 4 to 7, inclusive. When asymmetric motion partitioning is enabled, the current CU may be partitioned into PUs that do not each have the same size.
　Otherwise, if the size of the current CU is greater than the size of the smallest CU and asymmetric motion partition is disabled, part_mode shall be in the range of 0 to 2, inclusive. The size of the CU may refer to the size of a coding block (e.g., a luma coding block) of the CU.
　Otherwise, if the size of the current CU is equal to 8, the value of part_mode shall be in the range of 0 to 2, inclusive.
　Otherwise (the size of the current CU is greater than 8), the value of part_mode shall be in the range of 0 to 3, inclusive.

The relationship between part_mode and the associated value of the variable Part Mode is defined in Table 1, below. The variable Part Mode provides a human-readable name of a partitioning mode. The term part_mode may define an index value in a coded bitstream, consistent with Table 1, which maps to a definition defined by variable Part Mode in Table 1. In some examples, when part_mode is not present, the partition mode of current CU is inferred to be equal to PART_2N×2N.

TABLE 1

Name association to prediction mode and partitioning type.

| The coding mode of one CU | part_mode | PartMode |
|---|---|---|
| MODE_INTRA | 0 | PART_2N×2N |
|  | 1 | PART_N×N |
| MODE_INTER | 0 | PART_2N×2N |
|  | 1 | PART_2N×N |
|  | 2 | PART_N×2N |
|  | 3 | PART_N×N |
|  | 4 | PART_2N×nU |
|  | 5 | PART_2N×nD |
|  | 6 | PART_nL×2N |
|  | 7 | PART_nR×2N |

In H.264/AVC, a video sequence typically includes a series of video frames. Furthermore, in H.264/AVC, a group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describe an encoding mode for the respective frame. Video encoder 20 typically operates on blocks within individual video frames in order to encode the video data. In H.264/AVC, a block may correspond to a macroblock (MB) or a partition of a macroblock. An MB is a 16×16 block of luma samples and two corresponding blocks of chroma samples of a picture that has three sample arrays, or a 16×16 block of samples of a monochrome picture or a picture that is coded using three separate color planes. A MB partition is a block of luma samples and two corresponding blocks of chroma samples resulting from a partitioning of a macroblock for inter prediction for a picture that has three sample arrays, or a block of luma samples resulting from a partitioning of a macroblock for inter prediction of a monochrome picture or a picture that is coded using three separate color planes. In HEVC, a block may correspond to a PU. The sample blocks associated with blocks (e.g., video units) may have fixed or varying sizes, and may differ in size according to a specified coding standard.

In H.264/AVC, video encoder 20 generates a predictive block for an inter MB based on one or more reference pictures. Each inter MB may be partitioned in four different ways:

One 16×16 MB partition
Two 16×8 MB partitions
Two 8×16 MB partitions
Four 8×8 MB partitions Different MB partitions in one MB may have different reference index values for each direction (i.e., RefPicList0 or RefPicList1). Thus, a video coder may generate, based on different reference pictures, predictive blocks for different MB partitions of one inter MB. When an inter MB is not partitioned into four 8×8 MB partitions, the inter MB may have only one motion vector for the whole MB partition in each direction. In other words, when the inter MB is not partitioned into four 8×8 MB partitions, there may only be a single RefPicList0 motion vector for the inter MB and a single RefPicList1 motion vector for the inter MB.

When an MB is partitioned into four 8×8 MB partitions, each 8×8 MB partition can be further partitioned into sub-blocks. There are four different ways to partition an 8×8 MB partition into sub-blocks:

One 8×8 sub-block
Two 8×4 sub-blocks
Two 4×8 sub-blocks
Four 4×4 sub-blocks

Each sub-block can have a different motion vector in each direction. In other words, each sub-block in a B slice may have a RefPicList0 motion vector and a RefPicList1 motion vector. A "sub-block partition" is a term used to indicate how an 8×8 MB partition is partitioned into sub-blocks.

In HEVC, video encoder 20 may signal the motion information of a PU using merge mode or advanced motion vector prediction (AMVP) mode. In other words, in HEVC, there are two modes for the prediction of motion parameters (i.e., motion information), one being the merge mode and the other being AMVP. Motion prediction may comprise the determination of motion information of a block (e.g., a PU) based on motion information of one or more other blocks. The motion information of a PU may include motion vector(s) of the PU, reference index(es) of the PU, and one or more prediction direction indicators.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index into the candidate list. Video decoder 30 may obtain, from the bitstream, the index into the candidate list (i.e., the candidate list index). In addition, video decoder 30 may generate the same merge candidate list and may determine, based on the indication of the position of the selected merge candidate, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a predictive block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX (where X is 0 or 1) motion information of a current PU using AMVP mode, video encoder 20 may signal a RefPicListX motion vector difference (MVD) for the current PU and a RefPicListX reference index for the current PU in addition to signaling a RefPicListX motion vector predictor (MVP) flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP flag, a RefPicListX reference index value, and a RefPicListX MVD. In other words, the data in the bitstream representing the motion vector for the current PU may include data representing a reference index, an index to a candidate list, and an MVD.

Furthermore, when the motion information of a current PU is signaled using AMVP mode, video decoder 30 may obtain, from the bitstream, a MVD for the current PU and a MVP flag. Video decoder 30 may generate the same AMVP candidate list and may determine, based on the MVP flag, the selected AMVP candidate. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

Figure 2:
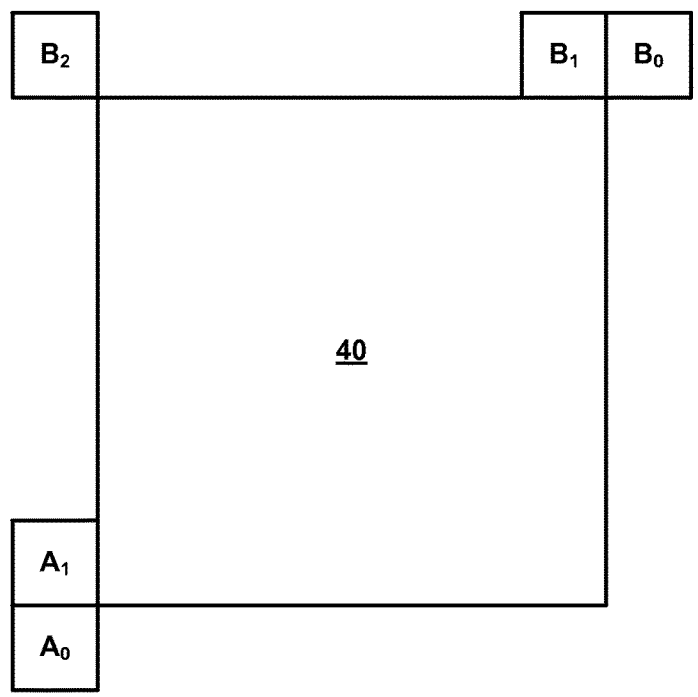
FIG. 2 is a conceptual diagram illustrating example spatially-neighboring prediction units (PUs) relative to a current PU.

When video decoder 30 generates an AMVP candidate list for a current PU, video decoder 30 may derive one or more AMVP candidates based on the motion information of PUs (i.e., spatially-neighboring PUs) that cover locations that spatially neighbor the current PU. FIG. 2 is a conceptual diagram illustrating example spatially-neighboring PUs relative to a current PU 40. In the example of FIG. 2, the spatially-neighboring PUs may be PUs that cover the locations indicated as $A_0$, $A_1$, $B_0$, $B_1$, and $B_2$. A PU may cover a location when a prediction block of the PU includes the location.

A candidate in a merge candidate list or an AMVP candidate list that is based on the motion information of a PU that temporally neighbors a current PU (i.e., a PU that is in a different time instance than the current PU) may be referred to as a temporal motion vector predictor (TMVP). TMVPs may be used to improve the coding efficiency of HEVC and, different from other coding tools, TMVPs may need to access the motion vector of a frame in a decoded picture buffer, more specifically in a reference picture list.

The use of TMVPs may be enabled or disabled on a CVS-by-CVS basis, a slice-by-slice basis, or on another basis. A syntax element (e.g., sps_temporal_mvp_enable_flag) in a SPS may indicate whether the use of TMVPs is enabled for a CVS. Furthermore, when the use of TMVPs is enabled for a CVS, the use of TMVPs may be enabled or disabled for particular slices within the CVS. For instance, a syntax element (e.g., slice_temporal_mvp_enable_flag) in a slice header may indicate whether the use of TMVPs is enabled for a slice. Thus, in an inter predicted slice, when the TMVP is enabled for a whole CVS (e.g., sps_temporal_mvp_enable_flag in a SPS is set to 1), slice_temporal_mvp_enable_flag is signaled in the slice header to indicate whether the use of TMVPs is enabled for the current slice.

To determine a TMVP, a video coder may firstly identify a reference picture that includes a PU that is co-located with the current PU. In other words, the video coder may identify a so-called co-located picture. If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. In other words, when the use of TMVPs is enabled for a current slice, and the current slice is a B slice (e.g., a slice that is allowed to include bi-directionally inter predicted PUs), video encoder 20 may signal a syntax element (e.g., collocated_from_l0 flag) in a slice header to indicate whether the co-located picture is in RefPicList0 or RefPicList1. After video decoder 30 identifies the reference picture list that includes the co-located picture, video decoder 30 may use another syntax element (e.g., collocated_ref_idx), which may be signaled in a slice header, to identify a picture (i.e., the co-located picture) in the identified reference picture list. That is, after a reference picture list is identified, collocated_ref_idx, signaled in a slice header may be used to identify the picture in the reference picture list.

The video coder may identify a co-located PU by checking the co-located picture. When the video coder checks the co-located PU, the video coder may check a right-bottom PU of the co-located picture and a center PU of the co-located picture. The right-bottom PU may cover a location that is co-located with a location immediately to below and right of a lower right corner of the prediction block of the current PU. The center PU may cover a location that is co-located with a center of the prediction block of the current PU. The TMVP may indicate the motion information of the right-bottom PU or the center PU.

When motion vectors identified by the above process (i.e., motion vectors of a TMVP) are used to generate a motion candidate for merge mode or AMVP mode, the video coder may scale the motion vectors based on the temporal location (reflected by POC value). For instance, a video coder may increase the magnitude of a motion vector by greater amounts when a difference between the POC values of a current picture and a reference picture is greater than when a difference between the POC values of the current picture and the reference picture is less.

The target reference index of all possible reference picture lists for the temporal merging candidate derived from a TMVP may be always set to 0. However, for AMVP, the target reference index of all possible reference pictures is set equal to the decoded reference index. In HEVC, a SPS may include a flag (e.g., sps_temporal_mvp_enable_flag) and the slice header may include a flag (e.g., pic_temporal_mvp_enable_flag) when sps_temporal_mvp_enable_flag is equal to 1. When both pic_temporal_mvp_enable_flag and a temporal_id are equal to 0 for a particular picture, no motion vector from pictures before that particular picture in decoding order are used as a TMVP in decoding of the particular picture or a picture after the particular picture in decoding order.

In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. A view component may contain a texture view component and a depth view component. In this disclosure, a "view" may refer to a sequence of view components associated with the same view identifier.

A texture view component (i.e., a texture picture) may be a coded representation of the texture of a view in a single access unit. A texture view may be a sequence of texture view components associated with an identical value of view order index. A view order index of a view may indicate a camera position of the view relative to other views. A depth view component (i.e., a depth picture) may be a coded representation of the depth of a view in a single access unit. A depth view may be a sequence of depth view components associated with an identical value of view order index.

Multi-view coding supports inter-view prediction. Inter-view prediction is similar to the inter prediction used in HEVC and may use the same syntax elements. However, when a video coder performs inter-view prediction on a current block (such as a PU), video encoder 20 may use, as a reference picture, a picture that is in the same access unit as the current block, but in a different view. In contrast, conventional inter prediction only uses pictures in different access units as reference pictures.

The texture view component includes the actual image content that is displayed. For example, the texture view component may include luma (e.g., Y) and chroma (e.g., Cb and Cr) components. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

In multi-view coding, a bitstream may have a plurality of layers. Each of the layers may correspond to a different view. In multi-view coding, a view may be referred to as a "base view" if a video decoder (e.g., video decoder 30) can decode pictures in the view without reference to pictures in any other view. A view may be referred to as a non-base view if decoding of the view is dependent on decoding of pictures in one or more other views.

For instance, NAL units may include headers (i.e., NAL unit headers) and payloads (e.g., RBSPs). The NAL unit headers may include nuh_reserved_zero_6 bits syntax elements. NAL units that have nuh_reserved_zero_6 bit syntax elements that specify different values belong to different "layers" of a bitstream. Thus, in multi-view coding, 3DV, or SVC, the nuh_reserved_zero_6 bits syntax element of a NAL unit specifies a layer identifier (i.e., a layer ID) of the NAL unit. In some examples, the nuh_reserved_zero_6 bits syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_reserved_zero_6 bits syntax element may have a non-zero value. As indicated above, in multi-view coding and 3DV coding, different layers of a bitstream may correspond to different views. In SVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

Figure 3:
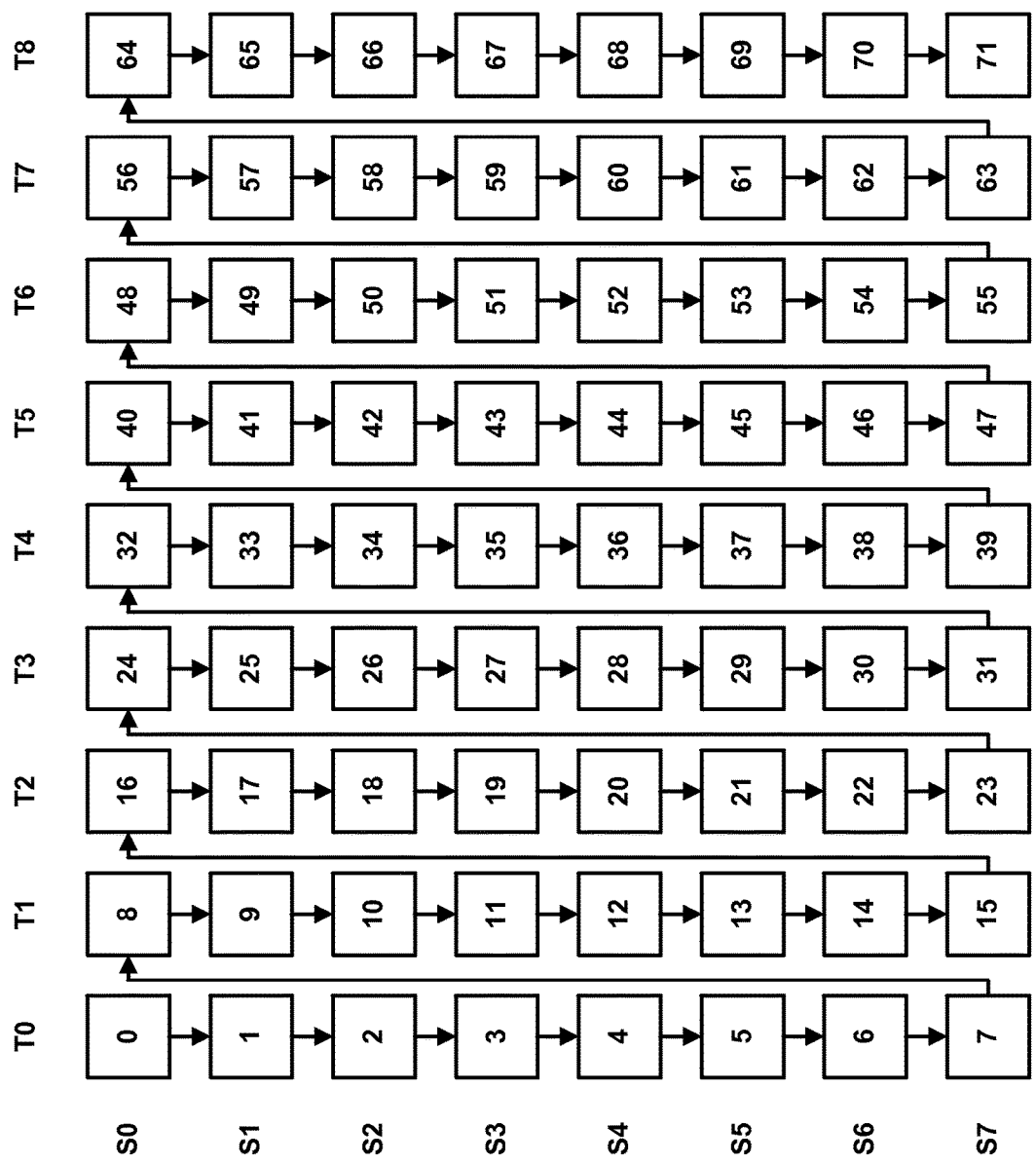
FIG. 3 is a conceptual diagram illustrating an example multi-view decoding order.

FIG. 3 is a conceptual diagram illustrating an example multi-view decoding order. The multi-view decoding order may be a bitstream order. In the example of FIG. 3, each square corresponds to a view component. Columns of squares correspond to access units. Each access unit may be defined to contain the coded pictures of all the views of a time instance. Rows of squares correspond to views. In the example of FIG. 3, the access units are labeled T0 . . . T8 and the views are labeled S0 . . . S7. Because each view component of an access unit is decoded before any view component of the next access unit, the decoding order of FIG. 3 may be referred to as time-first coding. The decoding order of access units may not be identical to the output or display order of the views.

Multi-view coding may support inter-view prediction. Inter-view prediction is similar to the inter prediction used in H.264/AVC, HEVC, or other video coding specifications and may use the same syntax elements. However, when a video coder performs inter-view prediction on a current block (such as a macroblock or PU), the video coder may use, as a reference picture, a picture that is in the same access unit as the current block, but in a different view. In contrast to the inter-view prediction described herein, conventional inter prediction only uses pictures in different access units as reference pictures.

Figure 4:
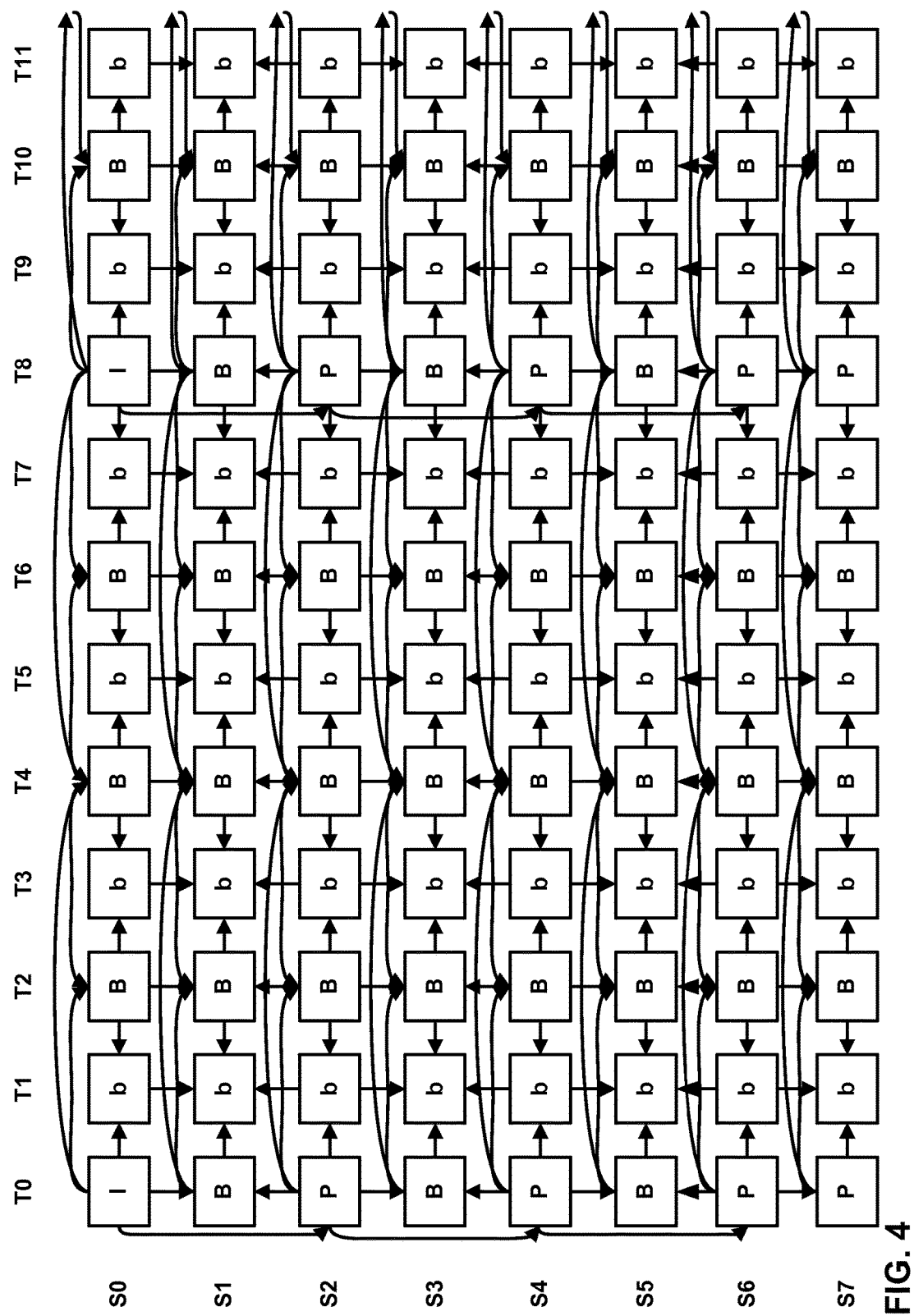
FIG. 4 is a conceptual diagram illustrating an example prediction structure for multi-view coding.

FIG. 4 is a conceptual diagram illustrating an example prediction structure for multi-view coding. The multi-view prediction structure of FIG. 4 includes temporal and inter-view prediction. In the example of FIG. 4, each square corresponds to a view component. In the example of FIG. 4, the access units are labeled T0 . . . T11 and the views are labeled S0 . . . S7. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 4, view components in different views of the same access unit may be available as reference pictures. The use of one view component of an access unit as a reference picture for another view component of the same access unit may be referred to as inter-view prediction.

In the MVC extension of H.264/AVC, inter-view prediction is supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multi-view representation. Consequently, any renderer with a MVC decoder may expect 3D video contents with more than two views.

In multi-view coding, inter-view prediction may be performed among pictures in different views of the same access unit (i.e., with the same time instance) to remove correlation between views. When coding a picture in one of the non-base views, a picture may be added into a reference picture list, if the picture is in a different view but with a same time instance. An inter-view prediction reference picture can be put in any position of a reference picture list, just like any inter prediction reference picture.

In the context of multi-view video coding, there are two kinds of motion vectors. One kind of motion vector is a normal motion vector that points to a temporal reference picture. The type of inter prediction corresponding to a normal, temporal motion vector may be referred to as "motion-compensated prediction" or "MCP." When an inter-view prediction reference picture is used for motion compensation, the corresponding motion vector is referred to as a "disparity motion vector." In other words, a disparity motion vector points to a picture in a different view (i.e., an inter-view reference picture). The type of inter prediction corresponding to a disparity motion vector may be referred to as "disparity-compensated prediction" or "DCP."

As mentioned above, a 3DV extension of HEVC (i.e., 3D-HEVC) is under development. 3D-HEVC may improve coding efficiency using inter-view motion prediction and inter-view residual prediction. In inter-view motion prediction, a video coder may determine (i.e., predict) the motion information of a current PU based on the motion information of a PU in a different view than the current PU. In inter-view residual prediction, a video coder may determine residual blocks of a current CU based on residual data in a different view than the current CU.

To enable inter-view motion prediction and inter-view residual prediction, a video coder may determine disparity vectors for blocks (e.g., PUs, CUs, etc.). In general, a disparity vector is used as an estimator of the displacement between two views. A video coder may use a disparity vector for a block either to locate a reference block in another view for inter-view motion or residual prediction, or the video coder may convert the disparity vector to a disparity motion vector for inter-view motion prediction. For instance, when a block is coded with inter-view motion prediction, a disparity vector may need to be derived for selecting a corresponding block in a different view.

Furthermore, a video coder may derive a disparity vector for a current block. In some examples, the video coder may use the method of Neighboring Blocks Based Disparity Vector (NBDV) to derive the disparity vector for the current block. That is, to derive a disparity vector for the current block, a process called NBDV may be used in a test model for 3D-HEVC (i.e., 3D-HTM). 3D-HEVC firstly adopted the NBDV process proposed in Zhang et al., "3D-CE5.h: Disparity vector generation results," Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, document JCT3V-A0097.

The NBDV process uses disparity motion vectors from spatial and temporal neighboring blocks to derive the disparity vector for the current block. Because neighboring blocks (e.g., blocks that spatially or temporally neighbor the current block) are likely to share almost the same motion and disparity information in video coding, the current block can use the motion vector information in the neighboring blocks as a predictor of the disparity vector of the current block. Thus, the NBDV process uses the neighboring disparity information for estimating the disparity vector in different views.

When a video coder performs the NBDV process, the video coder may check, in a fixed checking order, motion vectors of spatially-neighboring and temporally-neighboring PUs. That is, several spatial and temporal neighboring blocks are firstly defined, each of which are then checked in a pre-defined order that may be determined by the priority of the correlation between the current block and the candidate block (i.e., the spatial or temporal neighboring block). Thus, two sets of neighboring blocks are utilized. One set is from spatial neighboring blocks and the other set is from temporal neighboring blocks.

When the video coder checks the motion vector(s) of a spatially-neighboring or temporally-neighboring PU, the video coder may determine whether the motion vector(s) are disparity motion vectors. A disparity motion vector of a PU of a picture is a motion vector pointing to a location within an inter-view reference picture of the picture. An inter-view reference picture of a picture may be a picture that is in the same access unit as the picture, but in a different view. Once a disparity motion vector (i.e., the motion vector points to an inter-view reference picture) is found in the candidates, the video coder may convert the disparity motion vector to a disparity vector. For example, the video coder may set a horizontal component of the disparity vector for the current block equal to a horizontal component of the disparity motion vector and may set the vertical component of the disparity vector to 0.

In some designs of 3D-HEVC (e.g., 3D-HTM 6.0), when the video coder performs the NBDV process, the video coder checks disparity motion vectors in the temporal neighboring blocks, disparity motion vectors in the spatial neighboring blocks, and then implicit disparity vectors (IDVs) in order. An IDV may be a disparity vector of a spatially- or temporally-neighboring PU that is coded using inter-view prediction. IDVs may also be referred to as derived disparity vectors. An IDV may be generated when a PU employs inter-view motion vector prediction, i.e., the candidate for AMVP or merge modes is derived from a reference block in the other view with the help of a disparity vector. Such a disparity vector is called IDV. An IDV may be stored to the PU for the purpose of disparity vector derivation. For instance, even though the block is coded with motion prediction, a derived disparity vector for the block is not discarded for the purpose of coding a following block. Thus, when the video coder identifies a disparity motion vector or an IDV, the video coder may return the identified disparity motion vector or IDV. IDVs were included with a simplified version of NBDV in Sung et al., "3D-CE5.h: Simplification of disparity vector derivation for HEVC-based 3D video coding, document JCTV3-A0126." The use of IDVs in the NBDV process was further simplified in Kang et al., "3D-CE5.h related: improvements for disparity vector derivation," document JCT3V-B0047, by removing the IDVs stored in the decoded picture buffer and also improved coding gain with random access point (RAP) picture selection. The video coder may convert the returned disparity motion vector or IDV to a disparity vector and may use the disparity vector for inter-view motion prediction and inter-view residual prediction. Random access refers to a decoding of a bitstream starting from a coded picture that is not the first coded picture in the bitstream. The insertion of random access pictures or random access points into a bitstream at regular intervals may enable random access. Example types of random access pictures include Instantaneous Decoder Refresh (IDR) pictures, Clean Random Access (CRA) pictures, and Broken Link Access (BLA) pictures. Hence, IDR pictures, CRA pictures and BLA pictures are collectively referred to as RAP pictures. In some examples, RAP pictures may have NAL unit types are equal to BLA_W_LP, BLA_W_RADL, BLA_N_LP, IDR_W_RADL, IDR_N_LP, RSV_IRAP_VCL22, RSV_IRAP_VCL23, or CRA_NUT.

When the video coder identifies a disparity motion vector or an IDV, the video coder may terminate the checking process. Thus, once the video coder finds a disparity vector for the current block, the video coder may terminate the NBDV process. When the video coder is unable to determine a disparity vector for the current block by performing the NBDV process (i.e., when there is no disparity motion vector or IDV found during the NBDV process), the NBDV is marked as unavailable. In other words, it can be considered that the NBDV process returns an unavailable disparity vector.

If the video coder is unable to derive a disparity vector for the current block (i.e., if no disparity vector is found) by performing the NBDV process, the video coder may use a zero disparity vector as the disparity vector for the current PU. The zero disparity vector is a disparity vector having both horizontal and vertical components equal to 0. Thus, even when the NBDV process returns an unavailable result, other coding processes of the video coder that require a disparity vector may use a zero disparity vector for the current block. In some examples, if the video coder is unable to derive a disparity vector for the current block by performing the NBDV process, the video coder may disable inter-view residual prediction for the current block. However, regardless of whether the video coder is able to derive a disparity vector for the current block by performing the NBDV process, the video coder may use inter-view motion prediction for the current block. That is, if no disparity vector is found after checking all the pre-defined neighboring blocks, a zero disparity vector may be used for inter-view motion prediction while inter-view residual prediction may be disabled for the corresponding CU.

As mentioned above, the video coder may check spatially-neighboring PUs as part of the process of determining the disparity vector for the current PU. In some examples, the video coder checks the following spatially-neighboring blocks: the below-left spatially-neighboring block, the left spatially-neighboring block, the above-right spatially-neighboring block, the above spatially-neighboring block, and the above-left spatially-neighboring block. For instance, in some versions of the NBDV process, five spatial neighboring blocks are used for disparity vector derivation. The five spatially-neighboring blocks may cover the locations $A_0$, $A_1$, $B_0$, $B_1$, and $B_2$, respectively, as indicated in FIG. 2. The video coder may check the five spatially-neighboring blocks in the order of $A_1$, $B_1$, $B_0$, $A_0$, and $B_2$. The same five spatially-neighboring block may be used in merge modes for HEVC. Therefore, in some examples, no additional memory access is required. If one of the spatially-neighboring blocks has a disparity motion vector, the video coder may terminate the checking process and the video coder may use the disparity motion vector as the final disparity vector for the current block.

Furthermore, as mentioned above, the video coder may check temporally-neighboring PUs as part of the process to determine the disparity vector for the current block. For checking temporal neighboring blocks (e.g., PUs), a construction process of a candidate picture list may be performed first. In some examples, the video coder may check up to two reference pictures from the current view for disparity motion vectors. The first reference picture may be the co-located picture. Thus, the co-located picture (i.e., the co-located reference picture) may be first inserted into the candidate picture list, followed by other candidate pictures in ascending order of reference index. When the reference pictures with the same reference index in both reference picture lists are available, the reference picture in the same reference picture list as the co-located picture precedes, in the candidate list, the reference picture that is not in the same reference picture list as the co-located picture.

For each candidate picture (i.e., the random-access picture and the co-located picture) in the candidate picture list, the video coder may check three candidate regions. The three candidate regions may be defined as follows:
   CPU: A co-located region of the current PU or current CU.
   CLCU: A largest coding unit (LCU) covering the co-located region of the current block.
   BR: A bottom-right 4×4 block of the CPU.
If the PU that covers the candidate region specifies a disparity motion vector, the video coder may determine the disparity vector of the current video unit based on the disparity motion vector of the PU.

When the video coder checks a neighboring PU (i.e., a spatially- or temporally-neighboring PU), the video coder may check first whether the neighboring PU has a disparity motion vector. If none of the neighboring PUs has a disparity motion vector, the video coder may determine whether any of the spatially-neighboring PUs has an IDV. The video coder may check the spatially-neighboring PUs in the order of $A_0$, $A_1$, $B_0$, $B_1$, and $B_2$. If one of the spatially-neighboring PUs has an IDV and the IDV is coded as merge/skip mode, the video coder may terminate the checking process and may use the IDV as the final disparity vector for the current PU.

As indicated above, a video coder may apply an NBDV process to derive a disparity vector for a current block (e.g., a CU, PU, etc.). The disparity vector for the current block may indicate a location in a reference picture (i.e., a reference component) in a reference view. In some 3D-HEVC designs, the video coder is allowed to access depth information for the reference view. In some such 3D-HEVC designs, when the video coder uses the NBDV process to derive the disparity vector for the current block, the video coder may apply a refinement process to further refine the disparity vector for the current block. The video coder may refine the disparity vector for the current block based on the reference picture's depth map. The video coder may use a similar refinement process to refine a disparity motion vector for backward view synthesis prediction. In this way, the depth can be used to refine the disparity vector or disparity motion vector to be used for backward view synthesis prediction. This refinement process may be referred to herein as NBDV refinement ("NBDV-R"), the NBDV refinement process, or depth-oriented NBDV (Do-NBDV).

When the NBDV process returns an available disparity vector (e.g., when the NBDV process returns a variable that indicates that the NBDV process was able to derive a disparity vector for the current block based on a disparity motion vector or an IDV of a neighboring block), the video coder may further refine the disparity vector by retrieving depth data from the reference view's depth map. In some examples, the refinement process includes the following two steps:
   1. Use the disparity vector of the current block to locate a block in the reference view's depth map. In other words, locate a corresponding depth block by the derived disparity vector in the previously-coded reference depth view, such as the base view. In this example, the size of the corresponding block in the depth may be the same as the size of the current block.
   2. Select one depth value from among the four corner pixels of the corresponding depth block and convert the depth value to the horizontal component of the refined disparity vector. In this example, the video coder does not change the vertical component of the disparity vector.

When the NBDV process does not return an available disparity vector (e.g., when the NBDV process returns a variable that indicates that the NBDV process was unable to derive a disparity vector for the current block based on a disparity motion vector or an IDV of a neighboring block), the video coder does not perform the NBDV refinement process and the video coder uses, as the disparity vector for the current block, the zero disparity vector. In other words, when NBDV does not provide an available disparity vector, and thus the result of NBDV is unavailable, the above NBDV-R process is skipped and a zero disparity vector is directly returned.

In some 3D-HEVC designs, the video coder uses a refined disparity vector for a current block for inter-view motion prediction while the video coder uses an unrefined disparity vector for the current block for inter-view residual prediction. For example, the video coder may use the NBDV process to derive an unrefined disparity vector for the current block. The video coder may then apply the NBDV refinement process to derive a refined disparity vector for the current block. The video coder may use the refined disparity vector for the current block for the purpose of determining motion information of the current block. Moreover, the video coder may use the unrefined disparity vector for the current block for the purpose of determining a residual block of the current block. In some examples, the video coder may store the refined disparity vector as a motion vector of one PU if the PU is coded with BVSP mode.

A backward view synthesis prediction (BVSP) approach was proposed in Tian et al., "CE1.h: Backward View Synthesis Prediction Using Neighboring Blocks," document JCT3V-00152 (hereinafter, "JCT3V-00152") and was adopted in the third JCT-3V meeting. A video coder may perform BVSP to synthesize a view component. Because the view component can be synthesized, it may be unnecessary for a bitstream to include a coded representation of the view component. For at least this reason, the use of BVSP may reduce the size of the bitstream.

BVSP is conceptually similar to block-based VSP in 3D-AVC. In other words, the basic idea of backward-warping VSP is the same as the block-based VSP in 3D-AVC. Both BVSP and block-based VSP in 3D-AVC use backward warping and block-based VSP to avoid transmitting motion vector differences and to use more precise motion vectors. However, implementation details are different due to different platforms.

In general, when a video coder performs BVSP to synthesize a reference texture picture, the video coder processes blocks (e.g., video units) in a dependent texture picture. The dependent texture picture and the synthesized texture picture are in the same access unit, but are in different views. When the video coder processes a block (i.e., a current block) of the dependent texture picture, the video coder may perform an NBDV process to identify a disparity vector of the current block. That is, in order to estimate the depth information for a block, a video coder may first derive a disparity vector from neighboring blocks.

Furthermore, when the video coder performs BVSP to synthesize the reference texture picture, the video coder may use the disparity vector of the current block to identify a reference block in a reference depth picture. In other words, the video coder may then use the derived disparity vector to obtain a depth block from a reference view. For instance, the disparity vector identified by the NBDV process may be denoted as $(dv_x, dv_y)$ and the current block position may be denoted as $(block_x, block_y)$. Furthermore, in this example, the video coder may fetch a depth block at $(block_x+dv_x, block_y+dv_y)$ in the depth image of the reference view. In this example, the fetched depth block has the same size of the current PU. The dependent texture picture and the reference depth picture are in the same access unit, but are in different views. The video coder may then perform a backward warping process to determine, based on sample values of the current block and sample values of the identified reference block of the reference picture, sample values of the synthesized picture In other words, the video coder, in this example, may use the fetched depth block to perform backward warping for the current PU.

As indicated above, when the video coder performs BVSP, the video coder may perform an NBDV process to identify a disparity vector for a current block. Furthermore, when the video coder performs BVSP, the video coder may use a refinement process similar to that described elsewhere in this disclosure to refine the disparity motion vector derived using the NBDV process. When the video coder performs the disparity vector refinement process, the video coder may refine the disparity vector based on depth values in a depth map in a reference view. In other words, the depth can be used to refine the disparity vector or disparity motion vector to be used for BVSP. The refined disparity vector may be stored as the motion vector of one PU if the refined disparity vector is coded with BVSP mode.

In some versions of 3D-HEVC, texture first coding is applied. In texture first coding, a video coder codes (e.g., encodes or decodes) a texture view component prior to coding the corresponding depth view component (i.e., the depth view component having the same POC value and view identifier as the texture view component). Therefore, a non-base view depth view component is unavailable for use in coding a corresponding a non-base view texture view component. In other words, when a video coder codes a non-base texture view component, the corresponding non-base depth view component is unavailable. Therefore, the depth information may be estimated and used to perform BVSP.

Figure 5:
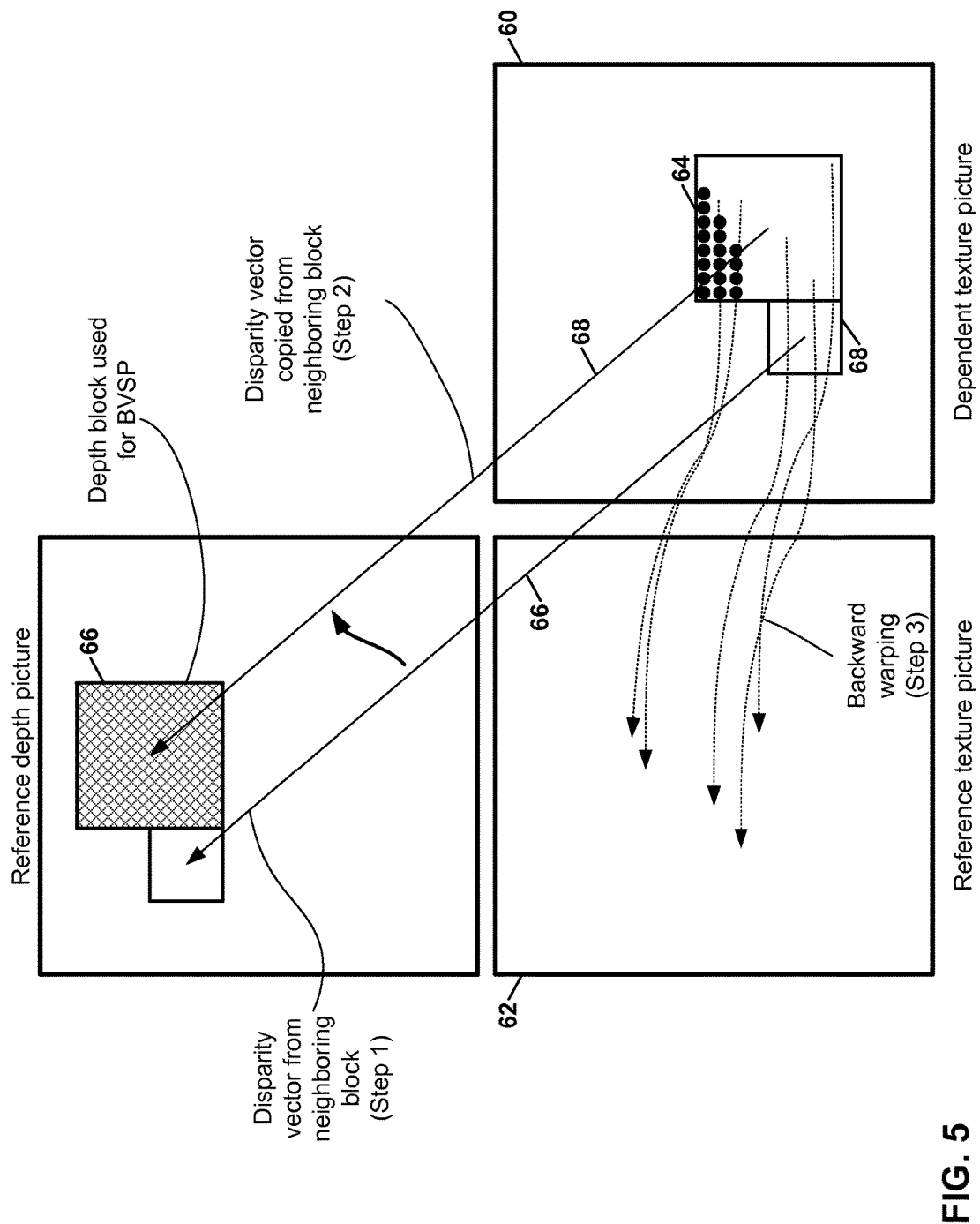
FIG. 5 is a conceptual diagram illustrating depth block derivation from a reference view to perform backward view synthesis prediction (BVSP).

FIG. 5 is a conceptual diagram illustrating depth block derivation from a reference view to perform BVSP prediction. In the example of FIG. 5, a video coder is coding a current texture picture 60. Current texture picture 60 is labeled a "dependent texture picture" because current texture picture 60 is dependent on a synthesized reference texture picture 62. In other words, the video coder may need to synthesize reference texture picture 62 in order to decode current texture picture 60. Reference texture picture 62 and current texture picture 60 are in the same access unit but are in different views.

In order to synthesize reference texture picture 62, the video coder may process blocks (i.e., video units) of current texture picture 60. In the example of FIG. 5, the video coder is processing a current block 64. When the video coder processes current block 64, the video coder may perform the NBDV process to derive a disparity vector for current block 64. For instance, in the example of FIG. 5, the video coder identifies a disparity vector 66 of a block 68 that neighbors current block 64. The identification of disparity vector 66 is shown as Step 1 of FIG. 5. Furthermore, in the example of FIG. 5, the video coder determines, based on disparity vector 66, a disparity vector 68 of current block 64. For instance, disparity vector 68 may be a copy of disparity vector 66. Copying disparity vector 66 is shown as Step 2 of FIG. 5.

The video coder may identify, based on disparity vector 68 of current block 64, a reference block 70 in a reference depth picture 72. Reference depth picture 72, current texture picture 60, and reference texture picture 62 may each be in the same access unit. Reference depth picture 72 and reference texture picture 62 may be in the same view. The video coder may determine, based on texture sample values of current block 64 and depth sample values of reference block 70, texture sample values of reference texture picture 62. The process of determining the texture sample values may be referred to as backward warping. Section H.8.5.2.2.7 of 3D-HEVC Test Model 3 describes the process of backward warping. Backward warping is shown as Step 3 of FIG. 5. In this way, FIG. 5 illuminates the three steps how a depth block from the reference view is located and then used for BVSP prediction.

In some examples, BVSP is enabled for some CVSs, but not others. In CVSs where BVSP is enabled, a video coder may perform an NBDV process that is different than the NBDV process for inter-view motion prediction. That is, if BVSP is enabled in a CVS, the NBDV process for inter-view motion prediction may be changed. When the video coder performs the NBDV process with regard to a current block in a CVS where BVSP is enabled, the video coder may determine whether temporal neighboring blocks have disparity motion vectors. If a temporal neighboring block has a disparity motion vector, the video coder may determine the disparity vector of the current block based on the disparity motion vector of the temporal neighboring block. The video coder may then refine the disparity vector. In other words, for each of the temporal neighboring blocks, if it uses a disparity motion vector, the disparity motion vector is returned as the disparity vector and it is further refined with the method described elsewhere in this disclosure.

Furthermore, when the video coder performs the NBDV process with regard to the current block, the video coder may evaluate spatial neighboring blocks. For each of the spatial neighboring blocks, the following apply. For RefPicList0 and RefPicList1 in order, if the spatial neighboring block uses a disparity motion vector, the video coder returns the disparity motion vector as the disparity vector of the current block and the video coder may further refine the disparity vector as described elsewhere in this disclosure. Otherwise, if the spatial neighboring block uses BVSP mode, the video coder returns the associated motion vector as the disparity vector of the current block and may refine the disparity vector in a manner similar to that described elsewhere in this disclosure. However, if the spatial neighboring block uses BVSP mode, the video coder may select the maximum depth value from all pixels of the corresponding depth block rather than four corner pixels and the video coder may set the vertical component of the refined disparity vector to 0. If the spatial neighboring block uses an IDV, the video coder may return the IDV as the disparity vector and the video coder may further refine the disparity vector with the method described elsewhere in this disclosure. If there is no disparity motion vector is available, the video decoder does not apply the refining process, and the video coder may derive a disparity vector is as a zero vector.

After the video coder determines a disparity vector for a current block and refines the disparity vector for the current block, the video coder may derive a disparity motion vector for the current block. For each sub-region (4×4 block) within the current block (i.e., one PU coded with BVSP mode), the video coder may locate, based on the refined disparity vector, a corresponding 4×4 depth block in the reference depth view. Secondly, the video coder may select the maximum value of the sixteen depth pixels in the corresponding depth block. Thirdly, the video coder may convert the maximum value to the horizontal component of a disparity motion vector. The video coder may set the vertical component of the disparity motion vector to 0.

A video coder is unlikely to be able to derive disparity vectors using NBDV for certain types of blocks (e.g., PUs, CUs, etc.). For example, unavailable disparity vectors are likely to occur from NBDV for blocks along slice, tile, or picture boundaries. In another example, unavailable disparity vectors are likely to occur from NBDV if neighboring blocks are all coded with intra prediction.

In general, a tile is an integer number of coding tree blocks co-occurring in one column and one row, ordered consecutively in coding tree block raster scan of the tile. A row may be an integer number of coding tree blocks. Columns are delineated from one another by vertical boundaries that extend from the top boundary to the bottom boundary of the picture and are ordered consecutively from left to right in the picture. Rows are delineated from one another by horizontal boundaries that extend from the left boundary to the right boundary of the picture and are ordered consecutively from top to bottom in the picture. A column may be an integer number of coding tree blocks.

The current disparity vector derivation method in 3D-HEVC has several problems. For example, when the NBDV process provides an unavailable disparity vector, the video coder may skip the NBDV-R process to refine the disparity vector. This may lead to a coding performance drop.

The techniques of this disclosure may have advantages over previous video coding techniques. For instance, the techniques of this disclosure may provide a better refined disparity vector by accessing the depth view component of a reference view when a disparity vector derivation method (e.g., NBDV in 3D-HEVC) cannot produce an available disparity vector.

In some examples, a video coder may perform a disparity vector derivation process for a current block of the multi-view video data. When the video coder performs the disparity vector derivation process, the video coder may or may not be able to successfully derive a disparity vector for the current block. For instance, the video coder may not be able to successfully derive a disparity vector for the current block by performing the disparity vector derivation process when none of the neighboring blocks has a disparity motion vector or an IDV. Hence, when the video coder performs the disparity vector derivation process, the video coder may generate a disparity vector for the current block and an availability value (e.g., availableDV). The availability value indicates whether the video coder was able to derive a disparity vector for the current block by performing the disparity vector derivation process.

In this disclosure, if the availability value indicates that the video coder was able to derive a disparity vector for the current block by performing the disparity vector derivation process, the disparity vector for the current block is "available." Likewise, if the availability value indicates that the video coder was unable to derive a disparity vector for the current block by performing the disparity vector derivation process, the disparity vector for the current block is "unavailable." Hence, the availability value indicates that the disparity vector for the current block is unavailable when the disparity vector derivation process is unable to derive the disparity vector for the current block. Furthermore, in this disclosure, the disparity vector derivation process is said to have returned an available or unavailable disparity vector depending on whether the video coder was able to derive a disparity vector for the current block by performing the disparity vector derivation process.

In accordance with one or more techniques of this disclosure, when the availability value indicates that the disparity vector derivation process has not derived a disparity vector for the current block, the video coder may nevertheless still perform a disparity vector refinement process to generate a refined disparity vector for the current block. Thus, the disparity vector refinement process is not limited to cases where the disparity vector derivation process produces an available disparity vector. Hence, even if the disparity vector derivation process does not produce an available disparity vector, the techniques of this disclosure may allow for disparity vector refinement with respect to a default disparity vector (such as a default disparity vector having horizontal and vertical components equal to zero).

For example, video decoder 30 may perform a disparity vector derivation process (e.g., an NBDV process) for a current block of the multi-view video data. The current block may be in a current view. Furthermore, an availability value may indicate that a disparity vector for the current block is unavailable when the disparity vector derivation process is unable to derive the disparity vector for the current block. In this example, when the availability value indicates that the disparity vector derivation process has not derived the disparity vector for the current block, video decoder 30 may generate a refined disparity vector for the current block by performing a disparity vector refinement process (e.g., an NBDV-R process) that accesses a depth view component of a reference view. Video decoder 30 may decode the current block based on the refined disparity vector for the current block. For instance, video decoder 30 may use the refined disparity vector to perform inter-view motion prediction, inter-view residual prediction and/or backward warping view synthesis prediction for the current block.

Similarly, video encoder 20 may perform a disparity vector derivation process (e.g., an NBDV process) for a current block of the multi-view video data. The current block may be in a current view. Furthermore, an availability value may indicate that a disparity vector for the current block is unavailable when the disparity vector derivation process is unable to derive the disparity vector for the current block. In this example, when the availability value indicates that the disparity vector derivation process has not derived the disparity vector for the current block, video encoder 20 may generate a refined disparity vector for the current block by performing a disparity vector refinement process (e.g., an NBDV-R process) that accesses a depth view component of a reference view. Video encoder 20 may encode the current block based on the refined disparity vector for the current block. For instance, video encoder 20 may use the refined disparity vector to perform inter-view motion prediction, inter-view residual prediction and/or backward warping view synthesis prediction for the current block.

In some examples, when the NBDV process returns an unavailable result after checking the disparity motion vector and IDVs in the neighboring blocks (i.e., when the availability value indicates that the disparity vector for the current block is unavailable), instead of directly using a zero disparity vector and skipping the refinement process in NBDV-R, a video coder may use a zero disparity motion vector in the NBDV-R process. Therefore, the refinement process in NBDV-R can be used to refine the disparity vector, by accessing the depth view component.

Alternatively, in some examples, when the NBDV process returns an unavailable disparity vector (i.e., when the availability value indicates that the disparity vector for the current block is unavailable), the video coder may set the availability of the current block to available and may set the disparity vector of the current block to zero. In other words, the video coder may modify the availability value to indicate that the disparity vector for the current block is available. The video coder may then apply the disparity vector refinement process to the disparity vector for the current block.

As indicated above, the NBDV process may return an availability value (e.g., availableDV). In one example, availableDV equal to 0 may indicate that the NBDV process returned an unavailable disparity vector. In other words, availableDV equal to 0 may indicate that the NBDV process was unable to derive the disparity vector for the current block. availableDV equal to 1 may indicate that the NBDV process returned an available disparity vector. In other words, availableDV equal to 1 may indicate that the NBDV process was able to derive the disparity vector for the current block. Furthermore, in this example, mvDisp denotes the disparity vector of the current block, mvDisp[0] denotes a horizontal component of the disparity vector of the current block, and mvDisp[1] denotes a vertical component of the disparity vector of the current block. Thus, in this example, when availableDV is equal to 0, the video coder may set mvDisp[0] to 0, set mvDisp[1] to 0, and set availableDV to 1. The video coder may then apply the disparity vector refinement process to mvDisp.

In this way, an availability value (e.g., availableDV) may indicate whether the disparity vector derivation process (e.g., the NBDV process) was able to derive a disparity vector for the current block. In this example, when the availability value indicates that the disparity vector derivation process was unable to derive the disparity vector for the current block, the video coder may set the availability value to indicate that the disparity vector for the current block is available and may set the disparity vector for the current block to a zero disparity vector.

Furthermore, in some examples where the video coder sets the availability value to indicate that the disparity vector of the current block to available and sets the disparity vector of the current block to zero when the NBDV process returns an unavailable disparity vector, the video coder may maintain a variable (e.g., availableDVRes) to identify whether or not the NBDV process originally returned an available disparity vector. The video coder may use the variable for other coding tools in certain conditions. For instance, this variable being equal to 0 may lead to the video coder disabling inter-view residual prediction for the current block. Thus, in this example, the video coder may maintain a variable to indicate whether the disparity vector derivation process originally derived the disparity vector for the current block. The video coder may provide the variable for use by one or more coding tools. Moreover, the video coder may enable one or more of the coding tools based on the value of the variable.

In some examples where the video coder sets the availability value of the disparity vector of the current block to available and sets the disparity vector of the current block to zero when the NBDV process returns an unavailable disparity vector, the video coder may add an offset to the disparity vector of the current block (i.e., the zero disparity vector). In this example, the video coder does not apply the disparity vector refinement process to the disparity vector for the current block. In other words, in this example, there is no refinement process using the depth information. Hence, in this example, when the disparity vector derivation process returns an unavailable disparity vector, the video coder may add an offset to a zero disparity vector to produce a modified disparity vector.

In the example of the previous paragraph, the video coder may set the offset in various ways. For example, the video coder may add the offset only to the horizontal component of the disparity vector of the current block. Furthermore, in some examples, the video coder (or another device) may compute the offset with camera parameters and a default depth pixel value (e.g., 128). Hence, in this example, the video coder may determine the offset based on one or more of camera parameters and a default depth pixel value. In some examples, video encoder 20 signals the offset in a slice header of a slice that contains the current block. Hence, in such examples, the video coder may determine the offset based on a signaled value received in a coded video bitstream. In such examples, the value may be signaled in a slice header.

In accordance with some techniques of this disclosure, one or more of the examples provided in this disclosure can be combined.

Figure 6:
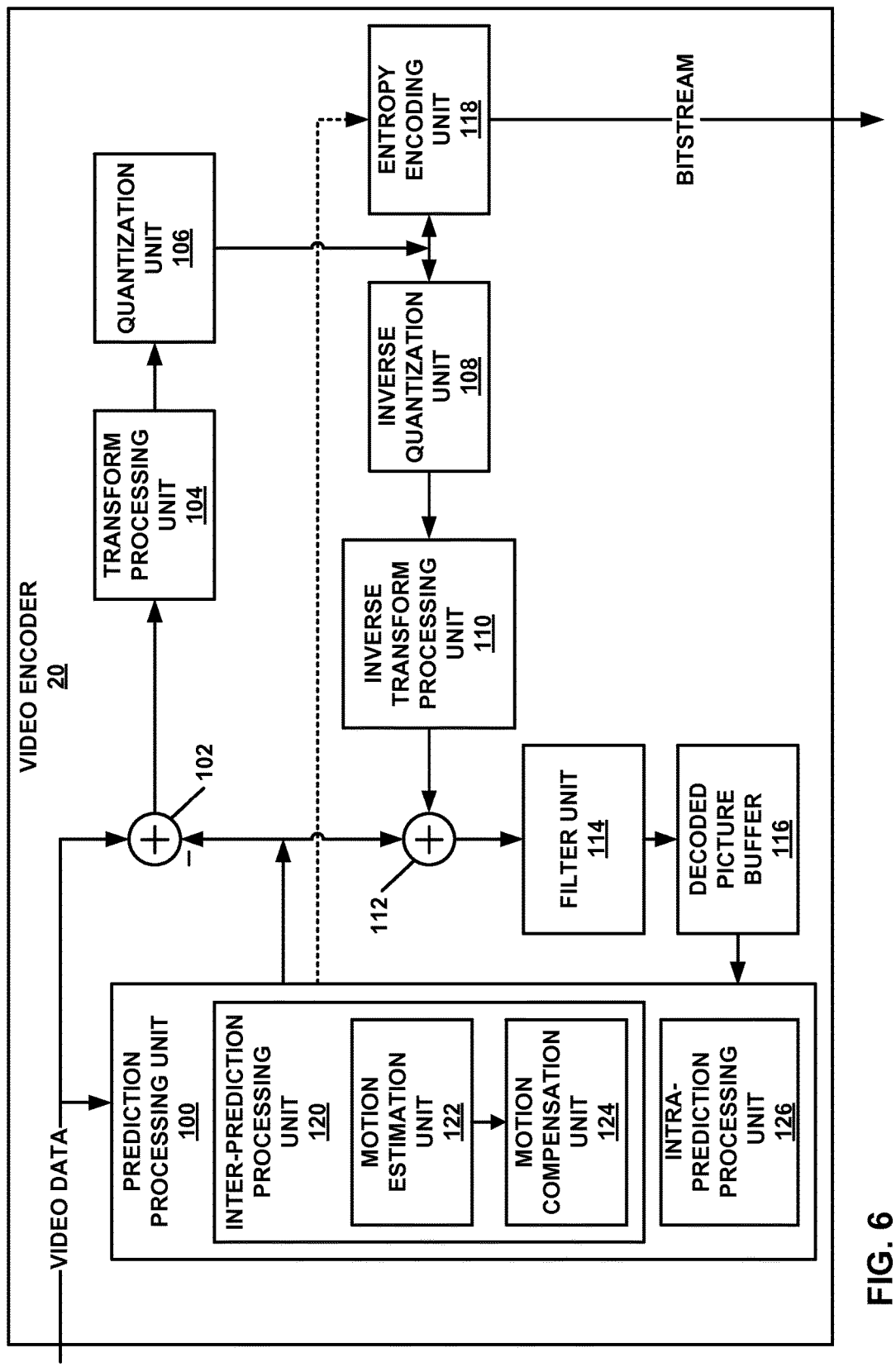
FIG. 6 is a block diagram illustrating an example video encoder that may implement the techniques described in this disclosure.

FIG. 6 is a block diagram illustrating an example video encoder 20 that may implement the techniques of this disclosure. FIG. 6 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 6, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

In some examples, inter-prediction processing unit 120 may derive a disparity vector for a current block (e.g., a CU, a PU, etc.). The disparity vector may support inter-view motion prediction, inter-view residual prediction, backward warping view synthesis prediction, and so on. In accordance with one or more techniques of this disclosure, inter-prediction processing unit 120 may perform a disparity vector derivation process for a current block of multi-view video data. An availability value indicates that a disparity vector for the current block is unavailable when the disparity vector derivation process is unable to derive the disparity vector for the current block. When the availability value indicates that the disparity vector derivation process has not derived the disparity vector for the current block, inter-prediction processing unit 120 may generate a refined disparity vector for the current block by performing a disparity vector refinement process that accesses a depth view component of a reference view.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding blocks of a CU and the selected predictive luma, Cb and Cr blocks of the PUs of the CU, luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. Reconstruction unit 112 may also be referred to as a summer. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU. Decoded picture buffer 116 may also be referred to as a reference picture memory. Hence, decoded picture buffer 116 may comprise a memory that stores video data, such as multi-view video data.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

Figure 7:
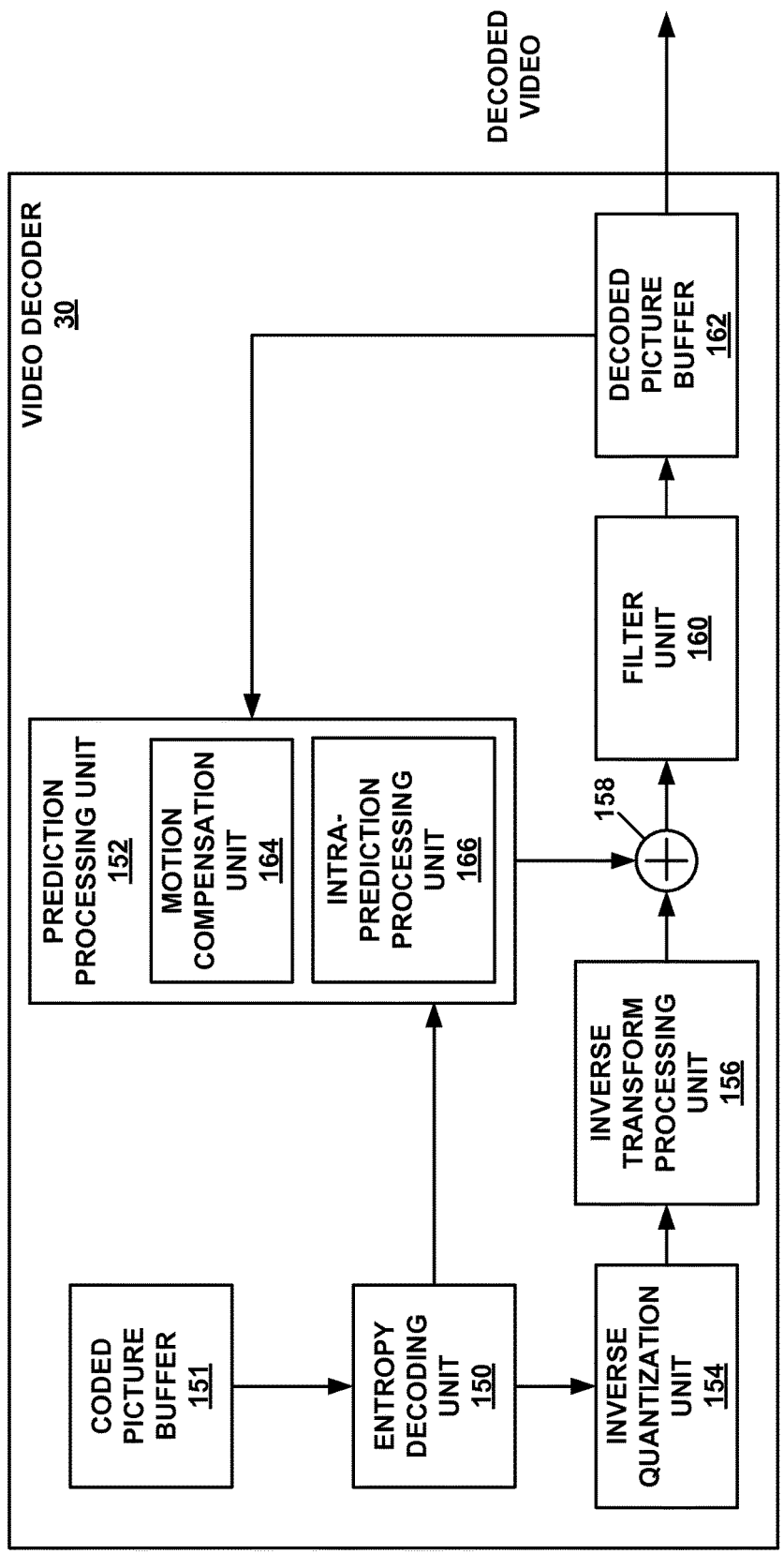
FIG. 7 is a block diagram illustrating an example video decoder that may implement the techniques described in this disclosure.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 7, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In addition to obtaining syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb, and Cr blocks for the PU.

In some examples, prediction processing unit 152 may derive a disparity vector for a current block (e.g., a CU, a PU, etc.). The disparity vector may support inter-view motion prediction, inter-view residual prediction, backward warping view synthesis prediction, and so on. In accordance with one or more techniques of this disclosure, prediction processing unit 152 may perform a disparity vector derivation process for a current block of multi-view video data. An availability value indicates that a disparity vector for the current block is unavailable when the disparity vector derivation process is unable to derive the disparity vector for the current block. When the availability value indicates that the disparity vector derivation process has not derived the disparity vector for the current block, prediction processing unit 152 may generate a refined disparity vector for the current block by performing a disparity vector refinement process that accesses a depth view component of a reference view.

Reconstruction unit 158 may use the residual values from the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU. Reconstruction unit 158 may also be referred to as a summer.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may also be referred to as a reference picture memory. Hence, decoded picture buffer 162 may comprise a memory that stores video data, such as multi-view video data. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

As described above, a video coder (e.g., video encoder 20 or video decoder 30) may use a NBDV process to determine a disparity vector. Furthermore, the video coder may perform a refinement process on the disparity vector. In accordance with some techniques of this disclosure, the video coder may perform the refinement process on a zero disparity vector when the NDBV process determines that the disparity vector is unavailable. The horizontal and vertical components of the zero disparity vector are equal to zero. In accordance with such techniques, sub-clauses H.8.5.4 of 3D HEVC Test Model Description Draft 3 may be modified as follows. In the following text, added subject matter is underlined.

H.8.5.4 Derivation Process for a Disparity Vector
. . .
When availableDV is equal to 1 and deriveFromDepthFlag is equal to 1, the following ordered steps apply:
1. The derivation process for disparity sample array as specified in subclause H.8.5.4.3 is invoked with the luma locations xP, yP, the disparity vector mvDisp, the view identifier refViewIdx, the variables nPSW, nPSH, the variable nSubBlkW equal to nPSW, the variable nSubBlkH equal to nPSH, and the flag restMaxSearchFlag being equal to 1 as the inputs, and the output is the array disparitySamples of size (nPSWDs)×(nPSHDs).

The horizontal component of the disparity vector mvDisp[0] is set equal to disparitySamples[0][0].

Otherwise, when availableDV is equal to 0 and deriveFromDepthFlag is equal to 1, the following ordered steps apply:

1. The derivation process for disparity sample array as specified in subclause H.8.5.4.3 is invoked with the luma locations xP, yP, the disparity vector mvDisp, which is set equal to 0, the view identifier refViewIdx, the variables nPSW, nPSH, the variable nSubBlkW equal to nPSW, the variable nSubBlkH equal to nPSH, and the flag restMaxSearchFlag being equal to 1 as the inputs, and the output is the array disparitySamples of size (nPSWDs)×(nPSHDs).

2. The horizontal component of the disparity vector mvDisp[0] is set equal to disparitySamples[0][0].

As indicated above, sub-clause H.8.5.4.3 "Derivation process for a disparity sample array" is invoked to refine the zero disparity vector using the associated depth information when there is no available disparity motion vector found in sub-clause H.8.5.4 "Derivation process for a disparity vector." Sub-clause H.8.5.4.3 of 3D HEVC Test Model Description Draft 3 is reproduced below.

H.8.5.4.3 Derivation Process for a Disparity Sample Array

Inputs to this process are:
a luma location (xP, yP) of the top-left luma sample of the current prediction unit relative to the top-left luma sample of the current picture,
a disparity vector mvDisp,
a view identifier refViewIdx specifying a reference view,
variables nPSW and nPSH specifying the width and the height, respectively, of the current prediction unit.
variable nSubBlkW and nSubBlkW specifying the conversion precision of the corresponding depth samples,
a flag restMaxSearchFlag specifying whether the search for the maximum disparity is restricted.

Outputs of this process are:
a (nPSW)×(nPSH) array disparitySamples of disparities values.

Let refDepPels be an array of reconstructed depth samples of the depth view component with ViewIdx equal to refViewIdx. The luma location $(x_{TL}, y_{TL})$ of top-left luma sample of refDepPels is derived by $$x_{TL} = \text{Clip3}(0, \text{pic\_width\_in\_luma\_samples} - nPSW - 1, xP + (mvDisp[0] >> 2)) \quad \text{(H-291)}$$

$$y_{TL} = \text{Clip3}(0, \text{pic\_height\_in\_luma\_samples} - nPSH - 1, yP + (mvDisp[1] >> 2)) \quad \text{(H-292)}$$

The array disparitySamples of size (nPSW)×(nPSH) is derived as specified in the following:

- For sBy in the range of 0 to ( ( nPSH / nSubBlkH ) −1 ), inclusive, the following applies:
  - For sBx in the range of 0 to ( ( nPSW / nSubBlkW) −1 ), inclusive, the following applies:
    - The variable maxDep is set equal to −1 and modified as specified in the following.

- If restMaxSearchFlag is equal to 0, the following applies:
  for ( yOff = 0; yOff < nSubBlkH; yOff++ )
   for ( xOff = 0; xOff < nSubBlkW; xOff++ ) {
    x = $x_{TL}$ + sBx * nSubBlkW + xOff
    y = $y_{TL}$ + sBy * nSubBlkH + yOff
    maxDep = Max( maxDep, refDepPels[ x ][ y ] )
   }
- Otherwise ( restMaxSearchFlag is equal to 1), the following applies:
   x = $x_{TL}$ + sBx * nSubBlkW
   y = $y_{TL}$ + sBy * nSubBlkH
   maxDep = Max( maxDep, refDepPels[ x ][ y ] )
   maxDep = Max( maxDep,
  refDepPels[ x ][ y + nSubBlkH − 1] )
   maxDep = Max( maxDep, refDepPels[ x + nSubBlkW − 1][ y ])
   maxDep = Max( maxDep, refDepPels[ x + nSubBlkW − 1][ y + nSubBlkH − 1] )
   maxDep = Max( maxDep,
  refDepPels[ x + nSubBlkW / 2 ][ y + nSubBlkH / 2 ] )
- The values of the array depthSamples are derived as specified in the following:
   for ( yOff = 0; yOff < nSubBlkH; yOff++ )
    for( xOff = 0; xOff < nSubBlkW; xOff++ ) {
     x = sBx * nSubBlkW + xOff
     y = sBy * nSubBlkH + yOff
     disparitySamples[ x ][ y ] =
   DepthToDisparityB[ refViewIdx ][ maxDep ]
    }

In other techniques of this disclosure, a video coder may always set the availability value for an NBDV result to 1, even when the NBDV process does not find an available disparity motion vector or IDV in any neighboring block. In accordance with some such techniques, sub-clause H.8.5.4 of 3D HEVC Test Model Description Draft 3 may be modified as follows. In the following text, added subject matter is underlined. Portions of sub-clause H.8.5.4 of 3D HEVC Test Model Description Draft 3 not shown below may be the same as in 3D HEVC Test Model Description Draft 3.

H.8.5.4 Derivation Process for a Disparity Vector

. . .

When availableDV is equal to 0, mvDisp[0] is set to 0, mvDisp[1] is set to 0, and availableDV is set to 1.

When availableDV is equal to 1 and deriveFromDepthFlag is equal to 1, the following ordered steps apply:

1. The derivation process for disparity sample array as specified in subclause H.8.5.4.3 is invoked with the luma locations xP, yP, the disparity vector mvDisp, the view identifier refViewIdx, the variables nPSW, nPSH, the variable nSubBlkW equal to nPSW, the variable nSubBlkH equal to nPSH, and the flag restMaxSearchFlag being equal to 1 as the inputs, and the output is the array disparitySamples of size (nPSWDs)×(nPSHDs).

The horizontal component of the disparity vector mvDisp[0] is set equal to disparitySamples[0][0].

In an alternative example, a variable availableDVRes may be introduced to disable using an unavailable NBDV result for inter-view residual prediction. In this example, the variable availableDVRes may be further used to control whether to perform inter-view residual prediction or not. In this example, instead of returning availableDV as an output of subclause H.8.5.4 of 3D HEVC Test Model Description Draft 3, availableDVRes is the output and is further used for inter-view residual prediction. In accordance with this example, sub-clauses H.8.5.4 and H.8.5.2.2.6 of 3D HEVC Test Model Description Draft 3 may be modified as follows. In the following text, added subject matter is underlined and deleted subject matter is italicized and enclosed in double square brackets. Portions of sub-clauses H.8.5.4 and H.8.5.2.2.6 of 3D HEVC Test Model Description Draft 3 not shown below may be the same as in 3D HEVC Test Model Description Draft 3.

H.8.5.4 Derivation Process for a Disparity Vector
. . .
When availableDV is equal to 0, mvDisp[0] is set to 0, mvDisp[1] is set to 0, availableDVRes is set to availableDV.
When [[availableDV is equal to 1 and]] deriveFromDepthFlag is equal to 1, the following ordered steps apply:
  2. The derivation process for disparity sample array as specified in subclause H.8.5.4.3 is invoked with the luma locations xP, yP, the disparity vector mvDisp, the view identifier refViewIdx, the variables nPSW, nPSH, the variable nSubBlkW equal to nPSW, the variable nSubBlkH equal to nPSH, and the flag restMaxSearchFlag being equal to 1 as the inputs, and the output is the array disparitySamples of size (nPSWDs)×(nPSHDs).
The horizontal component of the disparity vector mvDisp[0] is set equal to disparitySamples[0][0].
H.8.5.2.2.6 Inter-View Residual Prediction Process
The process is only invoked if res_pred flag is equal to 1.
Inputs to this process are:
  a luma location (xC, yC) specifying the top-left sample of the current luma coding block relative to the top left luma sample of the current picture,
  a luma location (xP, yP) of the top-left luma sample of the current prediction unit relative to the top-left luma sample of the current picture,
  a variable nCS specifying the size of the current luma coding block,
  variables nPSW and nPSH specifying the width and the height, respectively, of the current prediction unit,
  prediction list utilization flags, predFlagL0 and predFlagL1,
  a (nPSW)×(nPSH) array predSamples$_L$ of luma prediction samples,
  two (nPSW/2)×(nPSH/2) arrays predSamples$_{Cb}$ and predSamples$_{Cr}$ of chroma prediction samples.
Output of this process are:
  a modified version of the (nPSW)×(nPSH) array predSamples$_L$,
  a modified versions of the (nPSW/2)×(nPSH/2) arrays predSamples$_{Cb}$ and predSamples$_{Cr}$.
The derivation process for a disparity vector as specified in subclause H.8.5.4 is invoked with the luma locations (xC, yC) and (xP, yP), the coding block size nCS, the variables nPSW and nPSH, the partition index partIdx and the variable deriveFromDepthFlag being equal to 0, as the inputs and the outputs are the view order index refViewIdx, the flag [[availableDV]] availableDVRes and the disparity vector mvDisp
Let refResSamples$_L$ be the (PicWidthInSamples$_L$)×(PicHeightInSamples$_L$) array of luma residual samples ResSamples$_L$: of the view component with ViewIdx equal to refViewIdx. Let refResSamples$_{Cb}$ and refResSamples$_{Cr}$ be the (PicWidthInSamples$_L$/2)×(PicHeightInSamples$_L$/2) arrays of Cb and Cr residual samples ResSamples$_{Cb}$ and ResSamples$_{Cr}$, respectively, for inter-coded coding units for the view component with ViewIdx equal to refViewIdx.

When the flag [[availableDV]]availableDVRes is equal to 0 the whole decoding process of this sub-clause terminates.
For y proceeding over the values 0 . . . (nPSH−1) and x proceeding over the values 0 . . . (nPSW−1), the following ordered steps apply.
. . .

Figure 8:
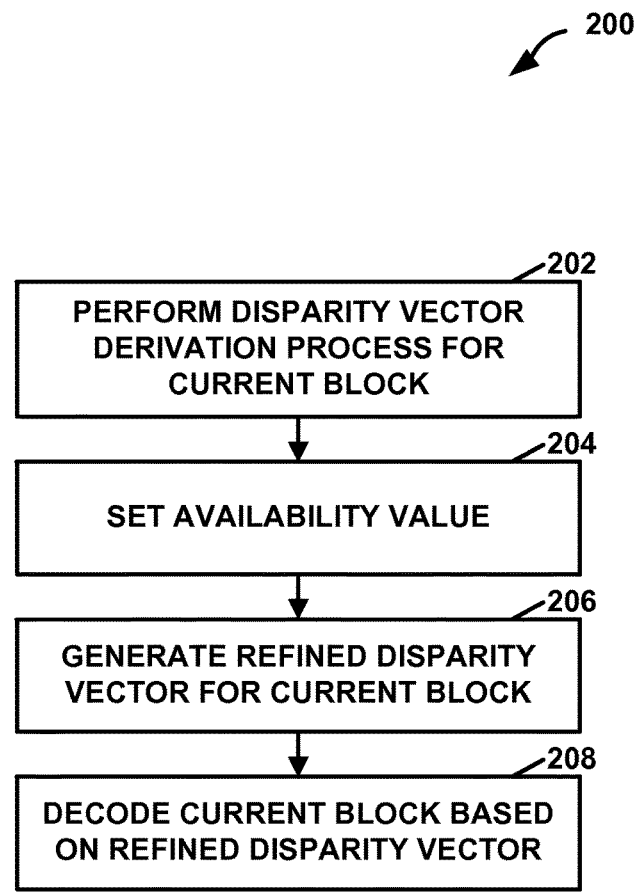
FIG. 8 is a flowchart illustrating an example operation of a video decoder to decode multi-view video data, in accordance with one or more techniques of this disclosure.

FIG. 8 is a flowchart illustrating an example operation 200 of video decoder 30 to decode multi-view video data, in accordance with one or more techniques of this disclosure. The multi-view video data may be 3D-HEVC video data. In the example of FIG. 8, video decoder 30 may perform a disparity vector derivation process for a current block of the multi-view video data (202). The current block is in a current view. Video decoder 30 may set an availability value such that the availability value indicates that a disparity vector for the current block is unavailable when the disparity vector derivation process is unable to derive the disparity vector for the current block (204). For instance, the availability value may indicate that the disparity vector for the current block is available when the disparity vector derivation process is able to derive the disparity vector for the current block from a disparity motion vector or an implicit disparity vector of a block that neighbors the current block. In some examples, video decoder 30 may set the availability value as part of performing the disparity vector derivation process.

Regardless of whether the availability value indicates that the disparity vector for the current block is available (e.g., when the availability value indicates that the disparity vector derivation process has not derived the disparity vector for the current block or when the availability value indicates that the disparity vector derivation process has derived the disparity vector for the current block), video decoder 30 may generate a refined disparity vector for the current block by performing a disparity vector refinement process that accesses a depth view component of a reference view (206). In some examples, video encoder 20 may generate the refined disparity vector for the current block by applying the disparity vector refinement process to a zero disparity vector.

In the example of FIG. 8, video decoder 30 decodes the current block based on the refined disparity vector for the current block (208). As part of decoding the current block based on the refined disparity vector for the current block, video decoder 30 may use the refined disparity vector for at least one of inter-view motion prediction, inter-view residual prediction, or backward view synthesis prediction. By using inter-view motion prediction, inter-view residual prediction, and/or backward view synthesis prediction, video decoder 30 may be able to reconstruct a sample block corresponding to the current block.

Figure 9:
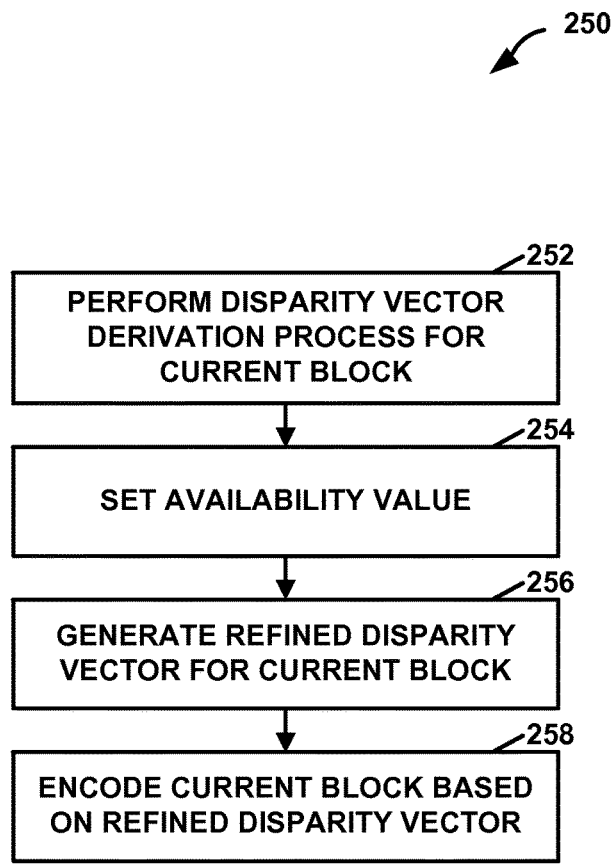
FIG. 9 is a flowchart illustrating an example operation of a video encoder to encode multi-view video data, in accordance with one or more techniques of this disclosure.

FIG. 9 is a flowchart illustrating an example operation 250 of video encoder 20 to encode multi-view video data, in accordance with one or more techniques of this disclosure. The multi-view video data may be 3D-HEVC video data. In the example of FIG. 9, video encoder 20 may perform a disparity vector derivation process for a current block of the multi-view video data (252). The current block is in a current view. Video encoder 20 may set an availability value such that the availability value indicates that a disparity vector for the current block is unavailable when the disparity vector derivation process is unable to derive the disparity vector for the current block (254). For instance, the availability value may indicate that the disparity vector for the current block is available when the disparity vector derivation process is able to derive the disparity vector for the current block from a disparity motion vector or an implicit disparity vector of a block that neighbors the current block. In some examples, video encoder 20 may set the availability value as part of performing the disparity vector derivation process.

Regardless of whether the availability value indicates that the disparity vector for the current block is available (e.g., when the availability value indicates that the disparity vector derivation process has not derived the disparity vector for the current block or when the availability value indicates that the disparity vector derivation process has derived the disparity vector for the current block), video encoder 20 may generate a refined disparity vector for the current block by performing a disparity vector refinement process that accesses a depth view component of a reference view (256). In some examples, video encoder 20 may generate the refined disparity vector for the current block by applying the disparity vector refinement process to a zero disparity vector. The reference view is different than the current view.

In the example of FIG. 9, video encoder 20 encodes the current block based on the refined disparity vector for the current block (258). In other words, video encoder 20 may use the refined disparity vector for the current block to generate an encoded representation of the current block. As part of encoding the current block based on the refined disparity vector for the current block, video encoder 20 may use the refined disparity vector for at least one of inter-view motion prediction, inter-view residual prediction, or backward view synthesis prediction.

Figure 10:
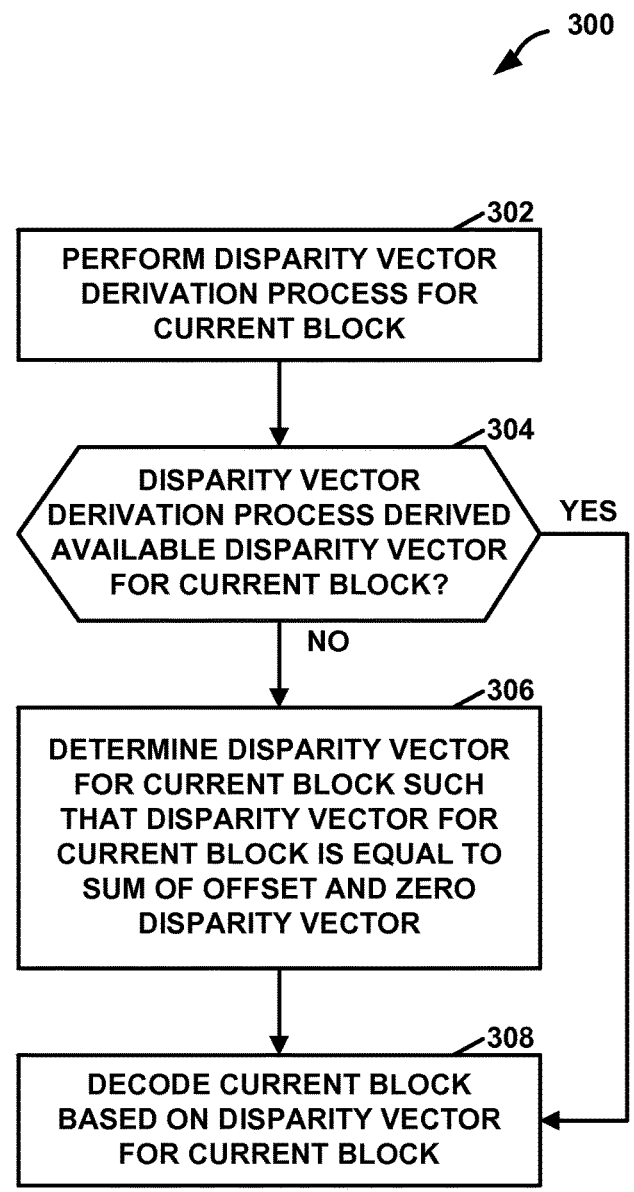
FIG. 10 is a flowchart illustrating an example operation of a video decoder to decode multi-view video data, in accordance with one or more additional techniques of this disclosure.

FIG. 10 is a flowchart illustrating an example operation 300 of video decoder 30 to decode multi-view video data, in accordance with one or more additional techniques of this disclosure. In the example of FIG. 10, video decoder 30 may perform a disparity vector derivation process to derive a disparity vector for a current block (302). For instance, video decoder 30 may perform an NBDV process to derive the disparity vector for the current block. Subsequently, video decoder 30 may determine whether the disparity vector derivation process derived an available disparity vector for the current block (304).

In response to determining that the disparity vector derivation process did not derive an available disparity vector for the current block ("NO" of 304), video decoder 30 may determine the disparity vector for the current block such that the disparity vector for the current block is equal to the sum of an offset and the zero disparity vector (306). In some examples, video decoder 30 may add the offset only to the horizontal component of the disparity vector of the current block. Furthermore, in some examples, video decoder 30 may compute the offset with camera parameters and a default depth pixel value (e.g., 128). In some examples, video encoder 20 signals the offset in a slice header of a slice that contains the current block.

After determining the disparity vector for the current block in (306) or in response to determining that the disparity vector derivation process derived an available vector for the current block ("YES" of 304), video decoder 30 may decode the current block based on the disparity vector for the current block (308). As part of decoding the current block based on the refined disparity vector for the current block, video decoder 30 may use the refined disparity vector for at least one of inter-view motion prediction, inter-view residual prediction, or backward view synthesis prediction. By using inter-view motion prediction, inter-view residual prediction, and/or backward view synthesis prediction, video decoder 30 may be able to reconstruct a sample block corresponding to the current block.

Figure 11:
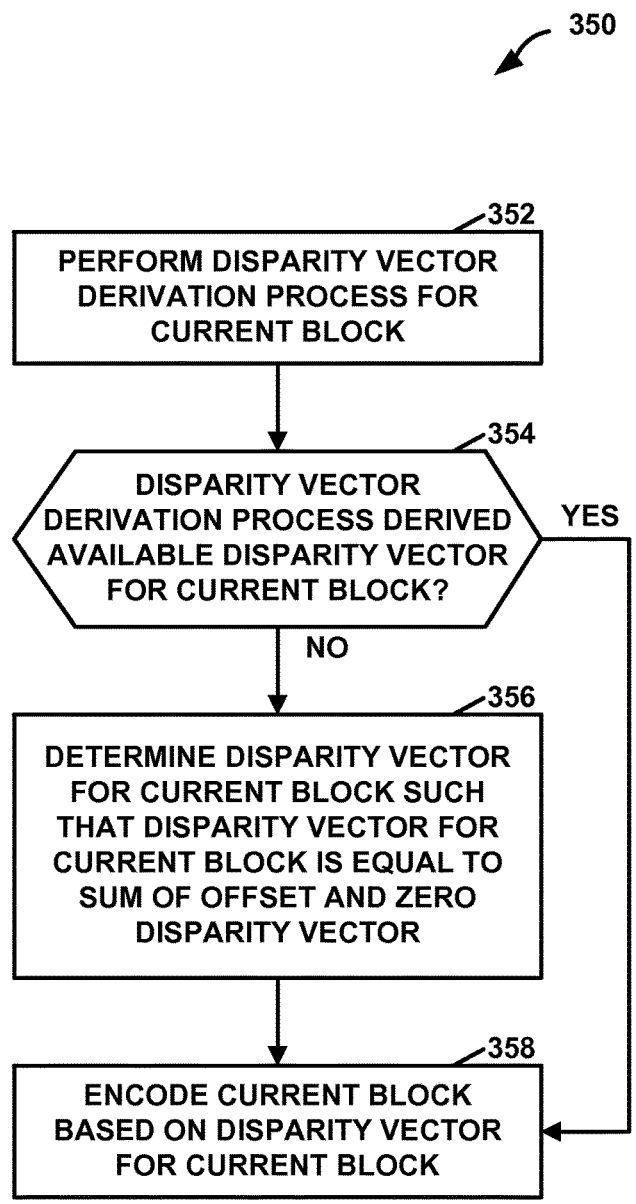
FIG. 11 is a flowchart illustrating an example operation of a video encoder to encode multi-view video data, in accordance with one or more additional techniques of this disclosure.

FIG. 11 is a flowchart illustrating an example operation 350 of video encoder 20 to encode multi-view video data, in accordance with one or more additional techniques of this disclosure. In the example of FIG. 11, video encoder 20 may perform a disparity vector derivation process to derive a disparity vector for a current block (352). For instance, video encoder 20 may perform an NBDV process to derive the disparity vector for the current block. Subsequently, video encoder 20 may determine whether the disparity vector derivation process derived an available disparity vector for the current block (354).

In response to determining that the disparity vector derivation process did not derive an available disparity vector for the current block ("NO" of 354), video encoder 20 may determine the disparity vector for the current block such that the disparity vector for the current block is equal to the sum of an offset and the zero disparity vector (356). In some examples, video encoder 20 may add the offset only to the horizontal component of the disparity vector of the current block. Furthermore, in some examples, video encoder 20 may compute the offset with camera parameters and a default depth pixel value (e.g., 128). In some examples, video encoder 20 signals the offset in a slice header of a slice that contains the current block.

After determining the disparity vector for the current block in (356) or in response to determining that the disparity vector derivation process derived an available vector for the current block ("YES" of 354), video encoder 20 may decode the current block based on the disparity vector for the current block (358).

The following are additional examples in accordance with the techniques of this disclosure.

EXAMPLE 1

A method for decoding multiview video data, the method comprising: performing a disparity vector derivation process for a current block of the multiview video data; and when the disparity vector derivation process does not produce an available disparity vector, performing a disparity vector refinement process to generate a refined disparity vector for the current block.

EXAMPLE 2

The method of example 1, wherein performing the disparity vector refinement process comprises performing the disparity vector refinement process using a zero disparity vector.

EXAMPLE 3

The method of example 2, further comprising generating the zero disparity vector for the disparity vector refinement process when the disparity vector derivation does not produce an available disparity vector.

EXAMPLE 4

The method of example 2, further comprising, when the disparity vector derivation process does not produce an available disparity vector, setting a status to indicate that the disparity vector is available and setting the value of the disparity vector to zero, and performing the disparity vector refinement process using the disparity vector with the value of zero.

EXAMPLE 5

The method of any of examples 1-4, or combinations thereof, further comprising maintaining a variable to indicate whether the disparity vector derivation process produced an available disparity vector.

EXAMPLE 6

The method of example 5, further comprising providing the variable for use by one or more coding tools.

EXAMPLE 7

The method of example 6, further comprising enabling one or more of the coding tools based on the value of the variable.

EXAMPLE 8

The method of example 1, further comprising, when the disparity vector derivation process does not produce an available disparity vector, adding an offset to a zero disparity vector to produce a modified disparity vector.

EXAMPLE 9

The method of example 8, further comprising determining the offset based on one or more of camera parameters and a default depth pixel value.

EXAMPLE 10

The method of example 8, further comprising determining the offset based on a signaled value received in a coded video bitstream.

EXAMPLE 11

The method of example 10, wherein the value is signaled in a slice header.

EXAMPLE 12

The method of any of examples 1-11, or combinations thereof, wherein the disparity vector derivation process is a neighboring block disparity vector (NBDV) derivation process.

EXAMPLE 13

The method of any of examples 1-12, or combinations thereof, wherein the disparity vector refinement process is neighboring block disparity vector refinement (NBDV-R) process.

EXAMPLE 14

The method of any of examples 1-13, or combinations thereof, further comprising using the refined disparity vector for at least one of inter-view motion prediction, inter-view residual prediction, or backward view synthesis prediction.

EXAMPLE 15

The method of any of examples 1-14, or combinations thereof, wherein the multiview video data is 3D-HEVC video data.

EXAMPLE 16

The method of any of examples 1-15, or combinations thereof, further comprising decoding the video data based on the refined disparity vector.

EXAMPLE 17

A method for encoding multiview video data, the method comprising: performing a disparity vector derivation process for a current block of the multiview video data; and when the disparity vector derivation process does not produce an available disparity vector, performing a disparity vector refinement process to generate a refined disparity vector for the current block.

EXAMPLE 18

The method of example 17, wherein performing the disparity vector refinement process comprises performing the disparity vector refinement process using a zero disparity vector.

EXAMPLE 19

The method of example 18, further comprising generating the zero disparity vector for the disparity vector refinement process when the disparity vector derivation does not produce an available disparity vector.

EXAMPLE 20

The method of example 18, further comprising, when the disparity vector derivation process does not produce an available disparity vector, setting a status to indicate that the disparity vector is available and setting the value of the disparity vector to zero, and performing the disparity vector refinement process using the disparity vector with the value of zero.

EXAMPLE 21

The method of any of examples 17-20, or combinations thereof, further comprising maintaining a variable to indicate whether the disparity vector derivation process produced an available disparity vector.

EXAMPLE 22

The method of example 21, further comprising providing the variable for use by one or more coding tools.

EXAMPLE 23

The method of example 22, further comprising enabling one or more of the coding tools based on the value of the variable.

EXAMPLE 24

The method of example 17, further comprising, when the disparity vector derivation process does not produce an available disparity vector, adding an offset to a zero disparity vector to produce a modified disparity vector.

EXAMPLE 25

The method of example 24, further comprising determining the offset based on one or more of camera parameters and a default depth pixel value.

EXAMPLE 26

The method of example 24, further comprising determining the offset based on a signaled value received in a coded video bitstream.

EXAMPLE 27

The method of example 26, wherein the value is signaled in a slice header.

EXAMPLE 28

The method of any of examples 17-27, or combinations thereof, wherein the disparity vector derivation process is a neighboring block disparity vector (NBDV) derivation process.

EXAMPLE 29

The method of any of examples 17-28, or combinations thereof, wherein the disparity vector refinement process is neighboring block disparity vector refinement (NBDV-R) process.

EXAMPLE 30

The method of any of examples 17-29, or combinations thereof, further comprising using the refined disparity vector for at least one of inter-view motion prediction, inter-view residual prediction, or backward view synthesis prediction.

EXAMPLE 31

The method of any of examples 17-30, or combinations thereof, wherein the multiview video data is 3D-HEVC video data.

EXAMPLE 32

A video decoding apparatus configured to perform the method of any of examples 1-16 or combinations thereof.

EXAMPLE 33

A video encoding apparatus configured to perform the method of any of examples 17-31 or combinations thereof.

EXAMPLE 34

A video decoding apparatus comprising means for performing the method of any of examples 1-16 or combinations thereof.

EXAMPLE 35

A video encoding apparatus comprising means for performing the method of any of examples 17-31 or combinations thereof.

EXAMPLE 36

A computer-readable medium comprising instructions to cause one or more processors to perform the method of any of examples 1-31 or combinations thereof

EXAMPLE 37

A method of encoding video data according to any of the techniques disclosed herein.

EXAMPLE 38

A method of decoding video data according to any of the techniques disclosed herein.

EXAMPLE 39

A device configured to perform any of the techniques disclosed herein.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding multi-view video data, the method comprising:
   performing a disparity vector derivation process for a current block of the multi-view video data, the current block being in a current view;
   setting an availability value such that the availability value indicates that a disparity vector for the current block is unavailable when the disparity vector derivation process is unable to derive the disparity vector for the current block;
   based on the disparity vector derivation process being unable to derive the disparity vector, generating the disparity vector, wherein generating the disparity vector comprises:
      based on the availability value indicating that the disparity vector for the current block is unavailable, applying a disparity vector refinement process to a zero disparity vector that has a zero horizontal component and a zero vertical component at least in part by:
         accessing a depth view component of a reference view, wherein the reference view is different from the current view;
         selecting a depth value from respective depth values associated with four corner pixels of a depth block associated with the depth view component of the reference view; and
         converting the selected depth value to a horizontal component of the generated zero disparity vector to form a refined disparity vector; and
   decoding the current block based on the refined disparity vector for the current block.

2. The method of claim 1, further comprising setting the availability value to indicate that the disparity vector for the current block is available.

3. The method of claim 2, further comprising:
   maintaining a variable to indicate whether the disparity vector derivation process originally derived the disparity vector for the current block; and
   providing the variable for use by one or more coding tools.

4. The method of claim 3, further comprising enabling one or more of the coding tools based on the value of the variable.

5. The method of claim 1, wherein:
   the disparity vector derivation process is a neighboring block disparity vector (NBDV) derivation process; and
   the disparity vector refinement process is a neighboring block disparity vector refinement (NBDV-R) process.

6. The method of claim 1, wherein decoding the current block based on the disparity vector for the current block comprises using the disparity vector for at least one of inter-view motion prediction, inter-view residual prediction, or backward view synthesis prediction.

7. The method of claim 1, wherein the multi-view video data is 3D-HEVC video data.

8. The method of claim 1, wherein the depth block and the current block are of a same size.

9. A method for encoding multi-view video data, the method comprising:
   performing a disparity vector derivation process for a current block of the multi-view video data, the current block being in a current view;
   setting an availability value such that the availability value indicates that a disparity vector for the current block is unavailable when the disparity vector derivation process is unable to derive the disparity vector for the current block;
   based on the disparity vector derivation process being unable to derive the disparity vector, generating the disparity vector, wherein generating the disparity vector comprises:
      based on the availability value indicating that the disparity vector for the current block is unavailable, applying a disparity vector refinement process to a zero disparity vector that has a zero horizontal component and a zero vertical component at least in part by:
         accessing a depth view component of a reference view, wherein the reference view is different from the current view;
         selecting a depth value from respective depth values associated with four corner pixels of a depth block associated with the depth view component of the reference view; and
         converting the selected depth value to a horizontal component of the generated zero disparity vector to form a refined disparity vector; and
   encoding the current block based on the refined disparity vector for the current block.

10. The method of claim 9, further comprising setting the availability value to indicate that the disparity vector for the current block is available.

11. The method of claim 10, further comprising:
    maintaining a variable to indicate whether the disparity vector derivation process originally derived the disparity vector for the current block; and
    providing the variable for use by one or more coding tools.

12. The method of claim 11, further comprising enabling one or more of the coding tools based on the value of the variable.

13. The method of claim 9, wherein:
    the disparity vector derivation process is a neighboring block disparity vector (NBDV) derivation process; and the disparity vector refinement process is a neighboring block disparity vector refinement (NBDV-R) process.

14. The method of claim 9, wherein encoding the current block based on the disparity vector for the current block comprises using the disparity vector for at least one of inter-view motion prediction, inter-view residual prediction, or backward view synthesis prediction.

15. The method of claim 9, wherein the multi-view video data is 3D-HEVC video data.

16. A video decoding device comprising:
a memory configured to store multi-view video data; and
one or more processors coupled to the memory and configured to:
perform a disparity vector derivation process for a current block of the multi-view video data, the current block being in a current view;
set an availability value such that the availability value indicates that a disparity vector for the current block is unavailable when the disparity vector derivation process is unable to derive the disparity vector for the current block;
based on the disparity vector derivation process being unable to derive the disparity vector, generate the disparity vector, wherein to generate the disparity vector the one or more processors are configured to:
apply, based on the availability value indicating that the disparity vector for the current block is unavailable, a disparity vector refinement process to a zero disparity vector that has a zero horizontal component and a zero vertical component, wherein to apply the disparity vector refinement process, the one or more processors are configured to:
access a depth view component of a reference view to generate the disparity vector for the current block, wherein the reference view is different from the current view;
select a depth value from respective depth values associated with four corner pixels of a depth block associated with the depth view component of the reference view; and
convert the selected depth value to a horizontal component of the generated zero disparity vector to form a refined disparity vector; and
decode the current block based on the refined disparity vector for the current block.

17. The video decoding device of claim 16, wherein the video decoding device comprises at least one of:
one or more integrated circuits;
one or more microprocessors;
one or more digital signal processors (DSPs);
one or more field programmable gate arrays (FPGAs);
a desktop computer;
a laptop computer;
a tablet computer;
a phone;
a television;
a camera;
a display device;
a digital media player;
a video game console;
a video game device;
a video streaming device; or
a wireless communication device.

18. The video decoding device of claim 16, wherein the one or more processors are configured to set the availability value to indicate that the disparity vector for the current block is available.

19. The video decoding device of claim 18, wherein the one or more processors are configured to:
maintain a variable to indicate whether the disparity vector derivation process originally derived the disparity vector for the current block; and
provide the variable for use by one or more coding tools.

20. The video decoding device of claim 19, wherein the one or more processors are configured to enable one or more of the coding tools based on the value of the variable.

21. The video decoding device of claim 16, wherein:
the disparity vector derivation process is a neighboring block disparity vector (NBDV) derivation process; and
the disparity vector refinement process is a neighboring block disparity vector refinement (NBDV-R) process.

22. The video decoding device of claim 16, wherein the one or more processors are configured to use the disparity vector for at least one of inter-view motion prediction, inter-view residual prediction, or backward view synthesis prediction.

23. The video decoding device of claim 16, wherein the multi-view video data is 3D-HEVC video data.

24. The video decoding device of claim 16, wherein the one or more processors are configured to decode the current block based on the refined disparity vector for the current block.

25. The video decoding device of claim 16, wherein the one or more processors are configured such that, as part of coding the current block based on the refined disparity vector for the current block, the one or more processors encode the current block based on the refined disparity vector for the current block.

26. A video decoding device comprising:
means for performing a disparity vector derivation process for a current block of multi-view video data, the current block being in a current view;
means for setting an availability value such that the availability value indicates that a disparity vector for the current block is unavailable when the disparity vector derivation process is unable to derive the disparity vector for the current block;
means for generating the disparity vector based on the disparity vector derivation process being unable to derive the disparity vector, the means for generating the disparity vector comprising:
means for applying, based on the availability value indicating that the disparity vector for the current block is unavailable, a disparity vector refinement process to a zero disparity vector that has a zero horizontal component and a zero vertical component, the means for applying the disparity vector refinement process comprising:
means for accessing a depth view component of a reference view, wherein the reference view is different from the current view;
means for selecting a depth value from respective depth values associated with four corner pixels of a depth block associated with the depth view component of the reference view; and
means for converting the selected depth value to a horizontal component of the generated zero disparity vector to form a refined disparity vector; and
means for decoding the current block based on the refined disparity vector for the current block.

27. A non-transitory computer-readable data storage medium having instructions stored thereon that, when executed, configure one or more processors of a video decoding device to:
perform a disparity vector derivation process for a current block of multi-view video data, the current block being in a current view;
set an availability value such that the availability value indicates that a disparity vector for the current block is unavailable when the disparity vector derivation process is unable to derive the disparity vector for the current block;
based on the disparity vector derivation process being unable to derive the disparity vector, generate the disparity vector, wherein the instructions to generate the disparity vector comprise instructions that, when executed, cause the one or more processors to:
apply, based on the availability value indicating that the disparity vector derivation process has not derived the disparity vector for the current block, a disparity vector refinement process to a zero disparity vector that has a zero horizontal component and a zero vertical component, wherein the instructions to apply the disparity vector refinement process comprise instructions that, when executed, cause the one or more processors to:
access a depth view component of a reference view, wherein the reference view is different from the current view;
select a depth value from respective depth values associated with four corner pixels of a depth block associated with the depth view component of the reference view; and
convert the selected depth value to a horizontal component of the generated zero disparity vector to form a refined disparity vector; and
decode the current block based on the refined disparity vector for the current block.

* * * * *